(12) United States Patent
Cao et al.

(10) Patent No.: US 7,643,659 B2
(45) Date of Patent: Jan. 5, 2010

(54) FACIAL FEATURE DETECTION ON MOBILE DEVICES

(75) Inventors: Jiangen Cao, Dublin, CA (US); Shu Li, Zhejiang (CN); Huaqi Zhang, Zhejiang (CN); Jin Wang, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 668 days.

(21) Appl. No.: 11/323,654

(22) Filed: Dec. 31, 2005

(65) Prior Publication Data
US 2007/0154096 A1 Jul. 5, 2007

(51) Int. Cl.
*G06K 9/00* (2006.01)
*G06K 9/56* (2006.01)
*G06K 9/40* (2006.01)
*G06K 9/20* (2006.01)

(52) U.S. Cl. ............. 382/118; 382/115; 382/117; 382/181; 382/205; 382/260; 382/274; 382/282

(58) Field of Classification Search .............. 382/115, 382/117, 118, 181, 205, 260, 274, 282
See application file for complete search history.

(56) References Cited

U.S. PATENT DOCUMENTS

| | | | | |
|---|---|---|---|---|
| 5,836,616 | A * | 11/1998 | Cooper ..................... | 283/56 |
| 6,049,747 | A * | 4/2000 | Nakajima et al. ............ | 701/45 |
| 7,155,036 | B2 * | 12/2006 | Li ........................... | 382/118 |
| 7,203,346 | B2 * | 4/2007 | Kim et al. ................. | 382/118 |
| 7,369,687 | B2 * | 5/2008 | Kawato et al. ............. | 382/118 |
| 2003/0053663 | A1 * | 3/2003 | Chen et al. ................ | 382/117 |
| 2003/0108223 | A1 * | 6/2003 | Prokoski ................... | 382/115 |
| 2004/0179719 | A1 * | 9/2004 | Chen et al. ................ | 382/118 |
| 2005/0102246 | A1 * | 5/2005 | Movellan et al. ............ | 706/12 |
| 2005/0119642 | A1 * | 6/2005 | Grecu et al. ............... | 606/5 |
| 2006/0010582 | A1 * | 1/2006 | Nagahashi et al. .......... | 2/425 |
| 2008/0080744 | A1 * | 4/2008 | Tanaka .................... | 382/118 |

OTHER PUBLICATIONS

Wang, Junyan, and Guangda Su, Xinggang Lin. "An Effective Approach to Chin Contour Extraction." Lecture notes in computer science 3644(2005): 203-212.*

(Continued)

*Primary Examiner*—Bhavesh M Mehta
*Assistant Examiner*—Michael A Newman
(74) *Attorney, Agent, or Firm*—Patent Law Group LLP; David C. Hsia

(57) ABSTRACT

Locating an eye includes generating an intensity response map by applying a 3-rectangle filter and applying K-mean clustering to the map to determine the eye. Locating an eye corner includes applying logarithm transform and grayscale stretching to generate a grayscale eye patch, generating a binary map of the patch by using a threshold based on a histogram of the patch, and estimating the eye corner by averaging coordinates weighted by minimal eigenvalues of spatial gradient matrices in a search region based on the binary map. Locating a mouth corner includes generating another intensity response map and generating another binary map using another threshold based on another histogram of the intensity response map. Locating a chin or a cheek includes applying angle constrained gradient analysis to reject locations that cannot be the chin or cheek. Locating a cheek further includes removing falsely detected cheeks by parabola fitting curves through the cheeks.

29 Claims, 20 Drawing Sheets

OTHER PUBLICATIONS

Li, Xiaobo, and Nicholas Roeder. "Face Contour Extraction From Front-View Images." Pattern Recognition 28-8(1995): 1167-1179.*

Bobis, Cesar Fraga, and Rafael Corsino Gonzales, Jose A. Cancelas, Ignacio Alvarez, Jose M. Enguita. "Face Recognition Using Binary Thresholding for Features Extraction." 10th International Conference on Image Analysis and Processing (ICIAP'99) (1999).*

Hong Chen et al., "Tooth Contour Extraction for Matching Dental Radiographs," 2004 IEEE, 4 pages.

Paul Viola et al., "Robust Real-time Object Detection," Cambridge Research Laboratory, Technical Report Series, CRL 2001/01, Feb. 2001, pp. 1-24.

Michael J. Jones et al., "Face Recognition Using Boosted Local Features," Mitsubishi Electric Research Laboratories, http://www.merl.com, pp. 1-8.

Andrew King, "A Survey of Methods for Face Detection," Mar. 3, 2003 paper, pp. 1-32.

* cited by examiner

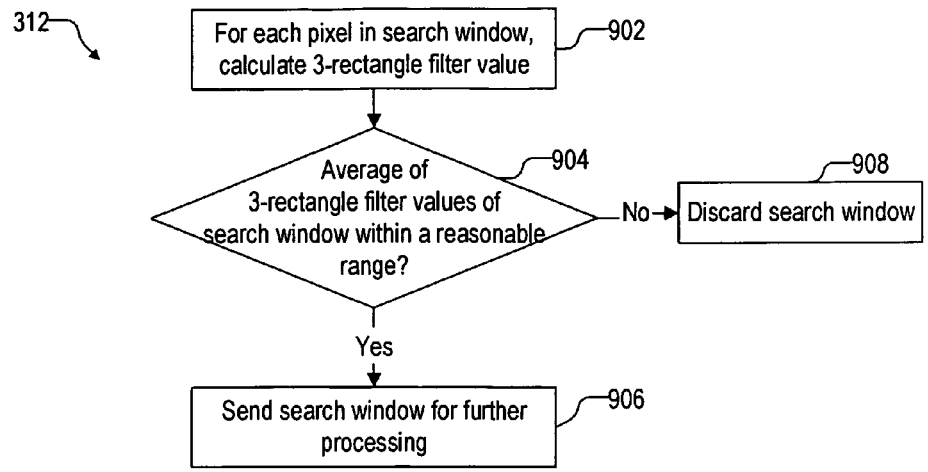
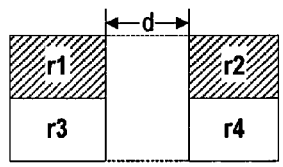
Fig. 10A
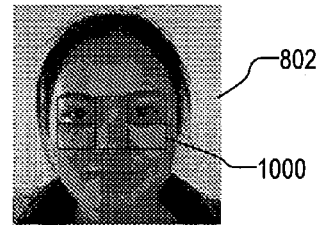
Fig. 10B
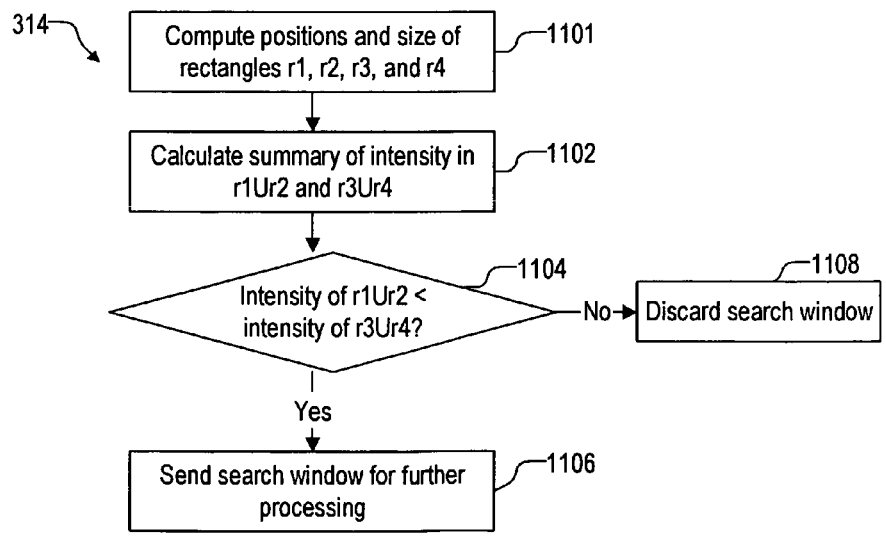
Fig. 11

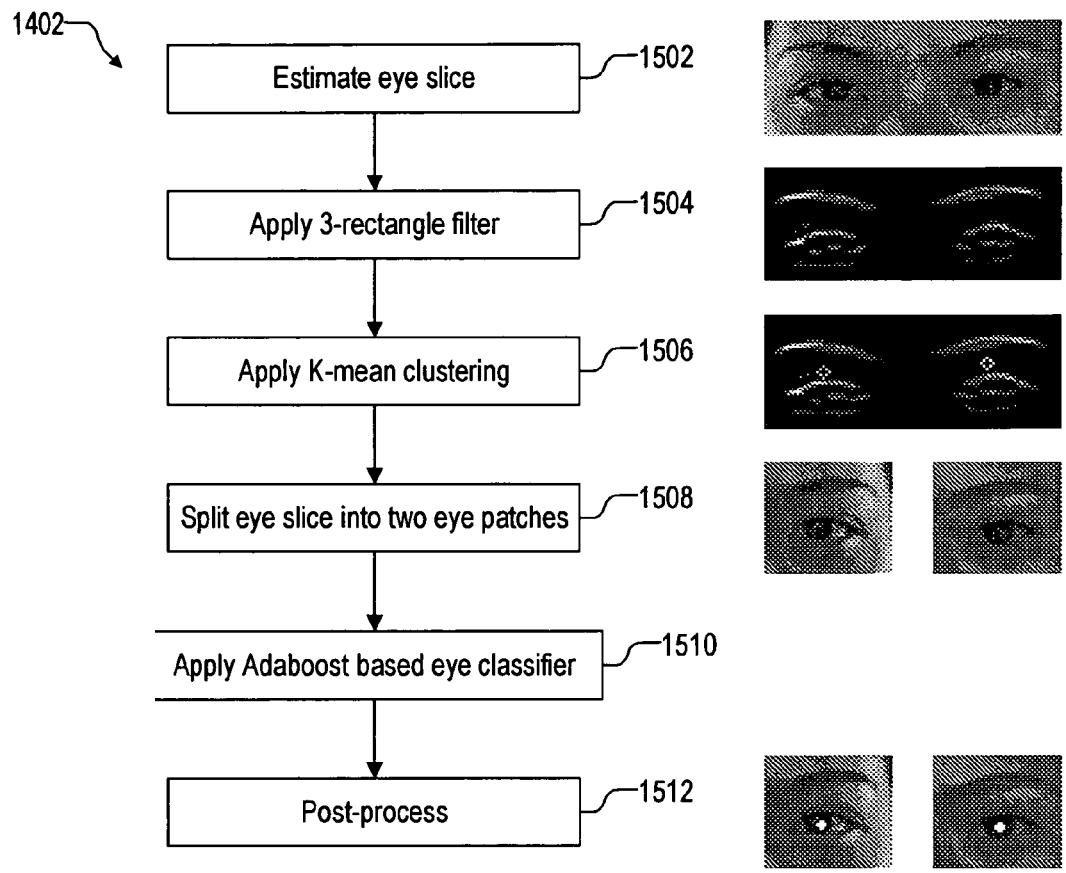
Fig. 15
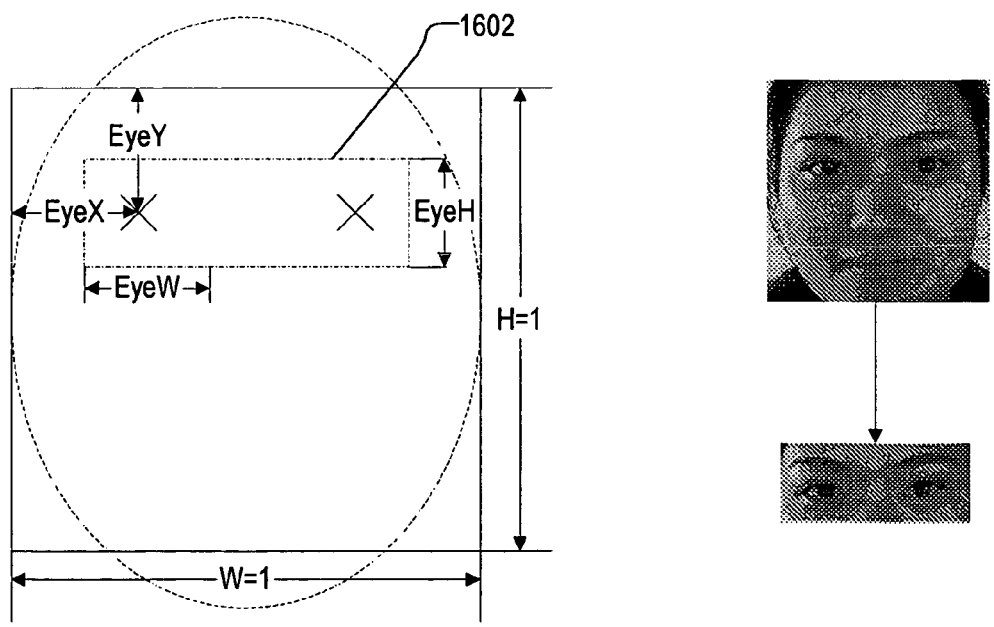
Fig. 16A
Fig. 16B

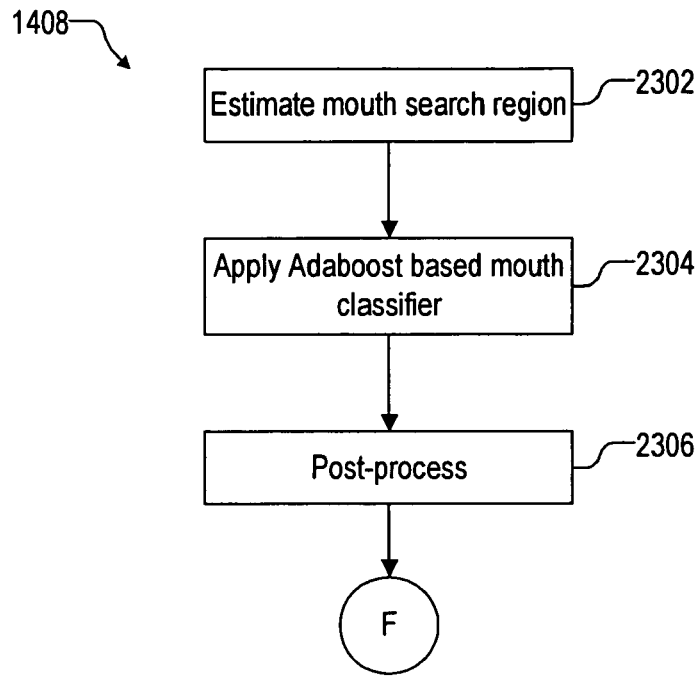
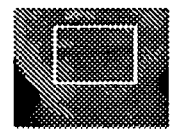
Fig. 23
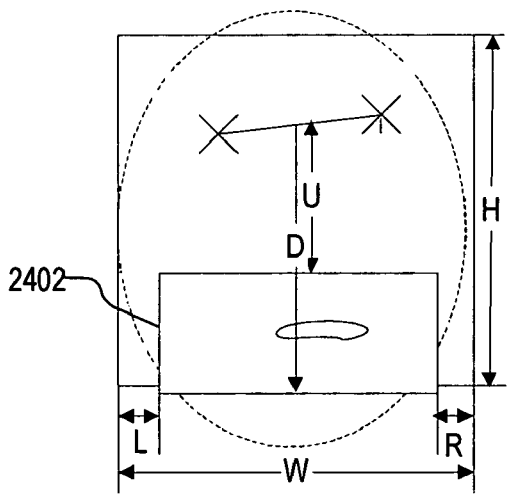
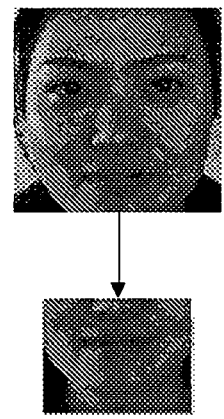
Fig. 24A          Fig. 24B

FACIAL FEATURE DETECTION ON MOBILE DEVICES

CROSS REFERENCE TO RELATED APPLICATION

This application is related to U.S. application Ser. No. 11/323,653, entitled "Face Detection on Mobile Devices," which is currently filed, commonly assigned, and incorporated by reference in its entirety.

FIELD OF INVENTION

This invention relates to a method for a mobile device to detect facial features on the face from an image.

DESCRIPTION OF RELATED ART

Face detection is a popular research topic. The AdaBoost algorithm for face detection was proposed by Viola and Jones in "Robust Real-Time Object Detection," Compaq Cambridge Research Laboratory, Cambridge, Mass., 2001. In the AdaBoost algorithm, Haar-like wavelet filters are used as weak classifiers. The weak classifiers are boosted to form a strong classifier by combining the weak classifiers. To accelerate detection speed, Viola and Jones introduced the concepts of an integral image and a cascaded framework. Using the integral image, a Haar-like feature can be calculated by simple additions and multiplications. Training the classifiers in a cascaded structure allows most of the negative samples to be rejected by the first several layers using very few computations.

However, the AdaBoost algorithm implements an exhaustive search scheme. Although the Haar-like features are simple to calculate and the cascaded structure rejects most of the negative samples with few computations, there are still many background pixels with similar characteristics as facial pixels that pass most of the cascaded classifiers. This means that the first few weak classifiers do not reject enough negative samples so that more commutations are needed.

While techniques have been developed for desktop computers, there are many difficulties in applying these techniques to embedded platforms on mobile or handheld devices. Limited memory and low computation ability of the embedded systems cause these techniques to fail or operate slowly. Thus, what is needed is a method for face and facial feature detection that runs robustly and rapidly on common mobile and handheld devices.

BRIEF DESCRIPTION OF THE DRAWINGS

FIG. 9 is a flowchart for applying the 3-rectangle filter to detect a facial area candidate in the method of FIG. 3A in one embodiment of the invention.

FIG. 10A illustrates a 4-rectangle filter in one embodiment of the invention.

FIG. 10B illustrates the application of the 4-rectangle filter to detect a facial area candidate in one embodiment of the invention.

FIG. 11 is a flowchart for applying the 4-rectangle filter to detect a facial area candidate in the method of FIG. 3A in one embodiment of the invention.

FIG. 15 is a flowchart with accompanying images of a method for detecting eyes from a facial area in the method of FIG. 14 in one embodiment of the invention.

FIGS. 16A and 16B illustrate the estimation of an eye slice in one embodiment of the invention.

FIG. 23 is a flowchart with accompanying images of a method for detecting a mouth from a facial area in the method of FIG. 14 in one embodiment of the invention.

FIGS. 24A and 24B illustrate the estimation of a mouth search region in one embodiment of the invention.

Unless stated otherwise, use of the same variable names in figures and equations do not indicate the same variables when the variable names appear in different methods in embodiments of the invention.

SUMMARY

In one embodiment of the invention, a method for rapidly detecting a face and facial features from the face is provided for mobile and handheld devices. The method combines Ada-Boost algorithm with additional filters and gradient analysis to accelerate the detection process.

In one embodiment, the method includes locating an eye by generating an intensity response map by applying a 3-rectangle filter and applying K-mean clustering to the map to determine the eye. The method further includes locating an eye corner by applying logarithm transform and grayscale stretching to generate a grayscale eye patch, generating a binary map of the patch by using a threshold based on a histogram of the patch, and estimating the eye corner by averaging coordinates weighted by minimal eigenvalues of spatial gradient matrices in a search region based on the binary map. The method further includes locating a mouth corner by generating another intensity response map and generating another binary map using another threshold based on another histogram of the intensity response map. The method further includes locating a chin or a cheek by applying angle constrained gradient analysis to reject locations that cannot be the chin or cheek. The locating a cheek further includes removing falsely detected cheeks by parabola fitting curves through the cheeks.

DETAILED DESCRIPTION

In accordance with the present invention, the AdaBoost algorithm is combined with filters to accelerate the detection of an area containing a face from an image. These filters include a skin color filter, a 3-rectangle filter, and a 4-rectangle filter. These filters reject negative samples in difference spaces. Specifically, the skin color filter detects skin color in the RGB space, the 3-rectangle filter imposes an intensity inconsistency constraint in the derivative space (e.g., $2^{nd}$ order), and the 4-rectangle filter detects eye regions in the intensity distribution space.

Figure 1:
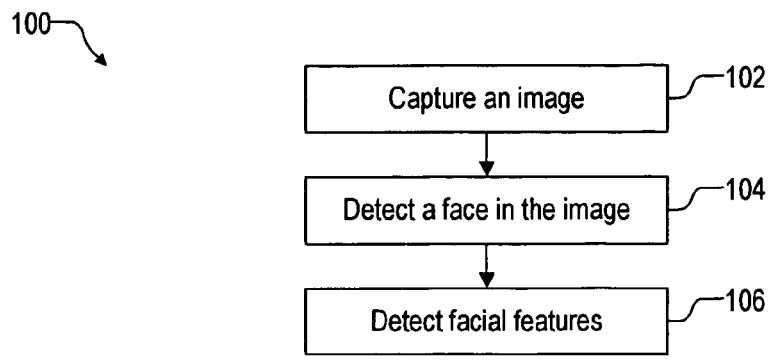
FIG. 1 is a flowchart of a method for detecting a face and facial features on the face from an image in one embodiment of the invention.

FIG. 1 illustrates a method 100 for detecting a facial area and facial features in the facial area from an image in one embodiment of the invention. Method 100 is implemented in embedded platforms in mobile and handheld devices.

Figure 2A:
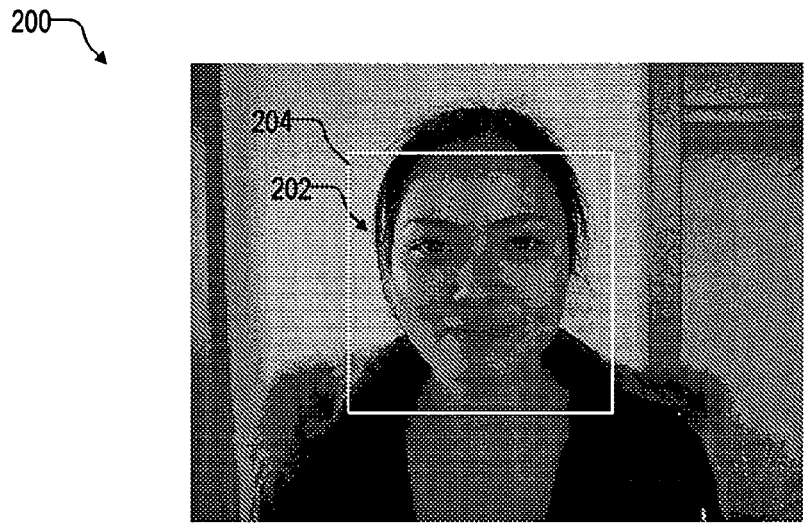
FIGS. 2A and 2B illustrate the detection of a face and facial features on the face from an image in one embodiment of the invention.

In step 102, the device captures or receives an image with a face (e.g., an image 200 with a face 202 in FIG. 2A). Image 200 is usually in color (e.g., in RGB format). Face 202 is usually greater than ¼ of the width and the height of image 200, and face 202 is usually turned less than 10 degrees away from the camera.

Figure 2B:
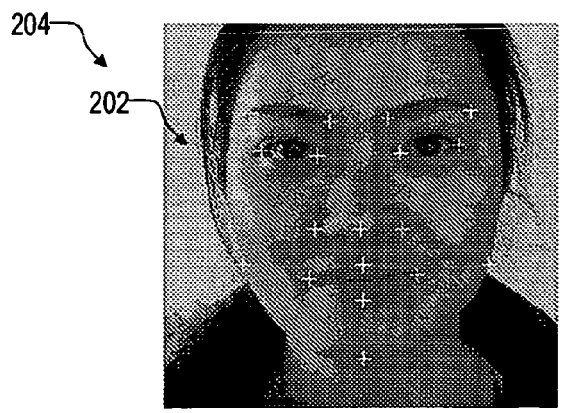

In step 104, the device detects a facial area (e.g., a facial area 204 in FIGS. 2A and 2B) containing face 202 on image 200.

In step 106, the device detects facial features from facial area 204. Facial features are shown as white crosses in FIG. 2B. Facial features include eye corners, mouth corners, a nose tip, a chin point, and check points. Additional facial features can be derived from the detected facial features. The derived facial features include the eye brow corners, nose corners, an upper lip midpoint, and a lower lip midpoint.

Face Detection

Figure 3A:
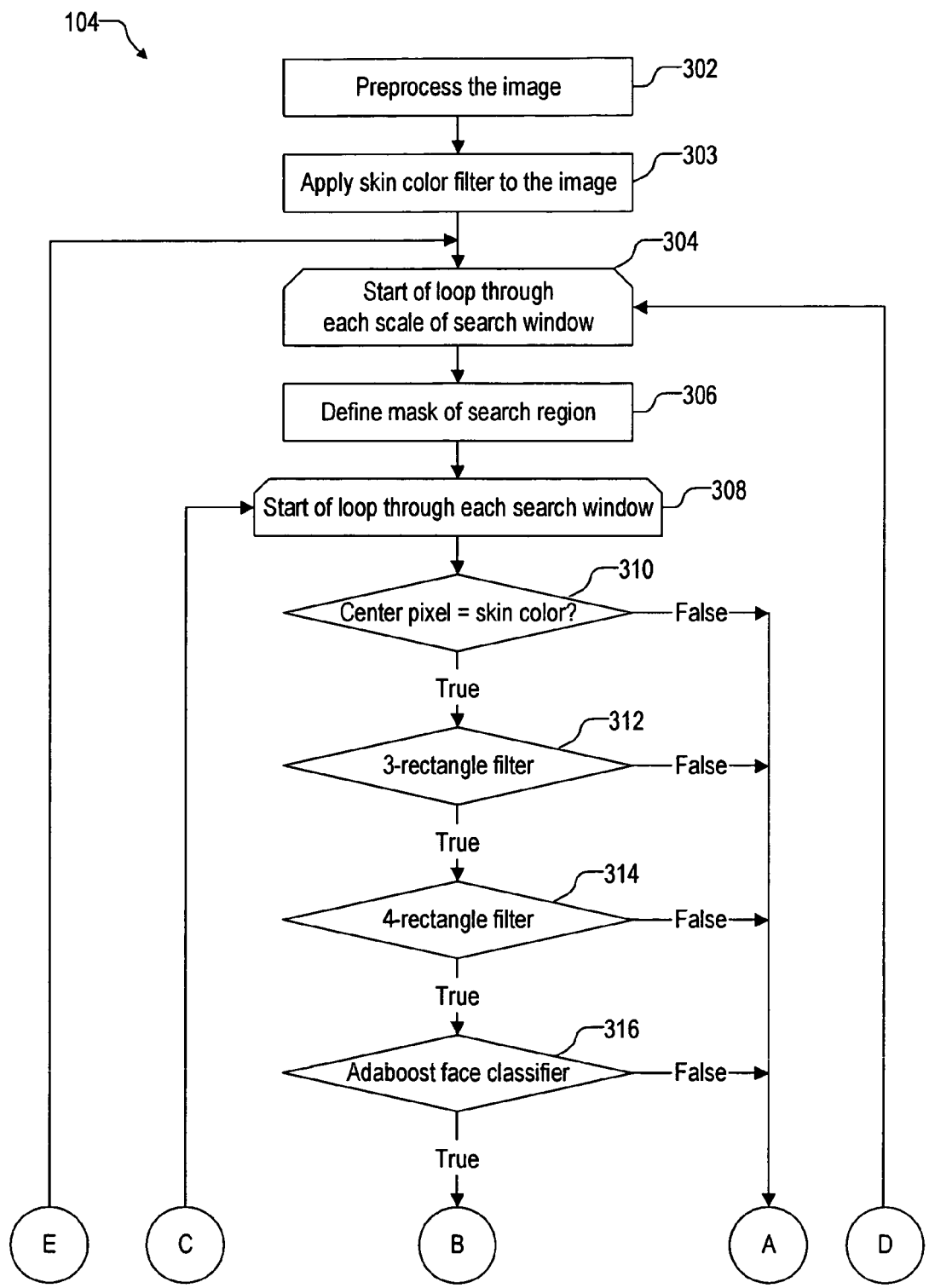
FIGS. 3A and 3B are a flowchart for detecting an area containing a face ("facial area") from an image in the method of FIG. 1 in one embodiment of the invention.
Figure 3B:
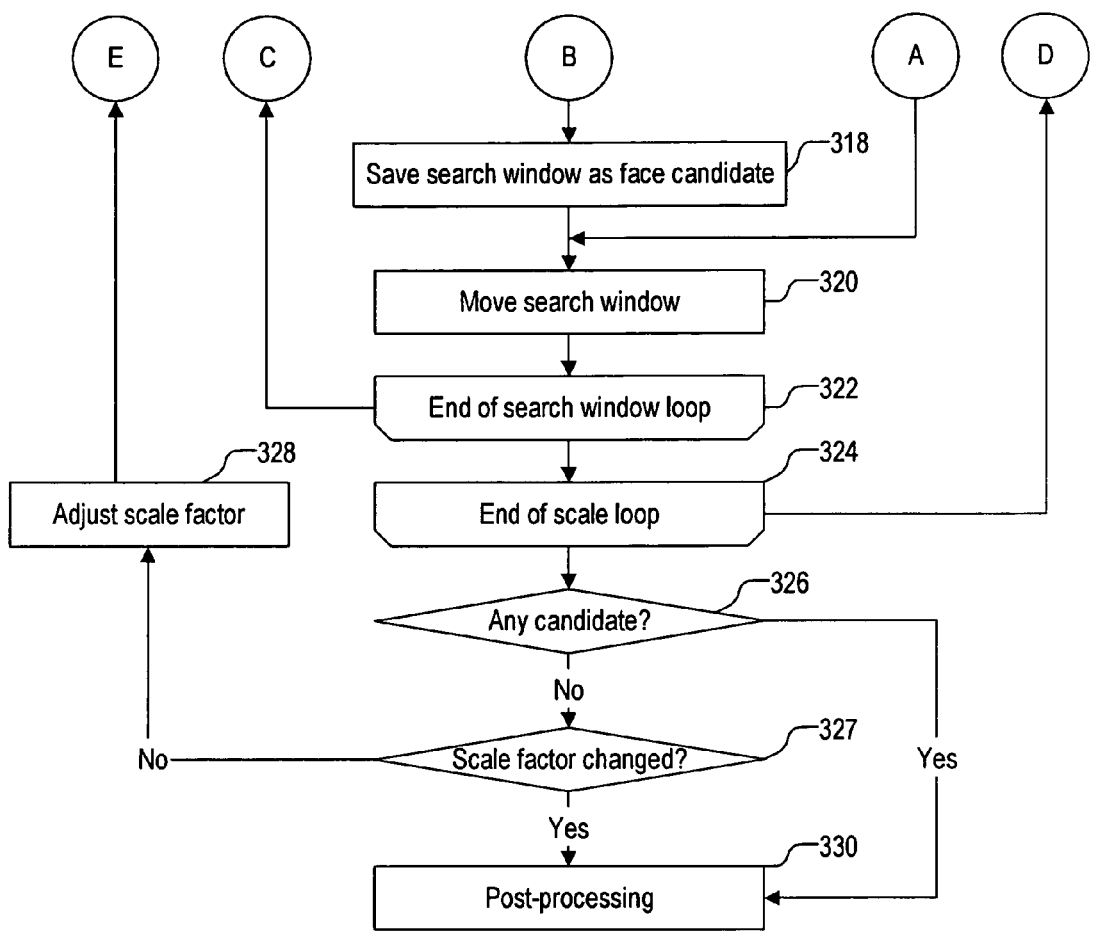

FIGS. 3A and 3B illustrate the details of step 104 (FIG. 1) for detecting a face from an image in one embodiment of the invention.

In step 302, the device preprocesses the image. Preprocessing includes reducing the size of the image, converting the color image to a grayscale image, and calculating an integral image from the grayscale image. The image is reduced in size to expedite the search process. In one embodiment, the image is resized to 120 by 160 pixels. The image is converted to a grayscale image for determining the integral image. The integral image is used in the AdaBoost algorithm and allows various filters to be applied with fewer calculations. Step 302 is followed by step 303.

In step 303, the device applies a skin-color filter to pixels in the image generated in step 302 to form a skin mask with 1's indicating skin color pixels and 0's to indicate non-skin color pixels. Embodiments of the skin color filter are described later. Step 303 is followed by step 304.

In step 304, the device starts to loop through the image generated in step 303 using search windows of various sizes. Search windows of various sizes are used to detect faces of various sizes. For example, the search window may have an initial size of 20 by 20 pixels that is increased by a scale of 1.2 through subsequent loops until the size of the search window exceeds the size of the image. If no facial area candidate is found after looping through all the search window sizes, then the loops through the search window sizes are repeated at a reduced scale (e.g., 1.1) to find facial area candidates. Step 304 is followed by step 306.

Figure 4:
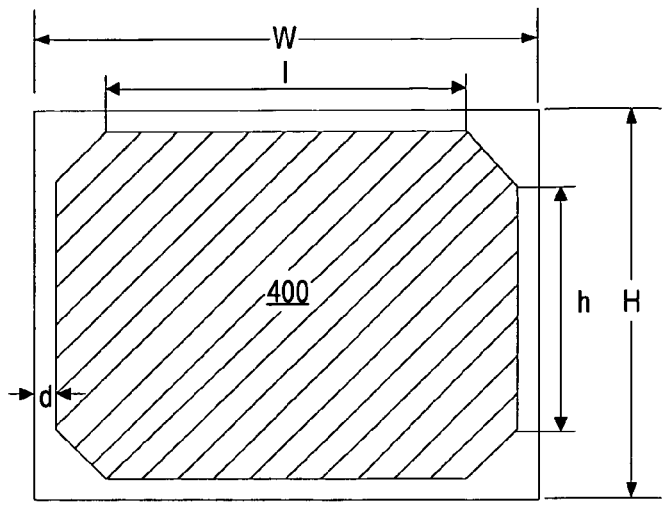
FIG. 4 illustrates a mask for searching a facial area from an image in one embodiment of the invention.

In step 306, the device defines a search mask 400 (FIG. 4) based on the assumption that the face is typically located near the center of an image. In one embodiment, mask 400 is defined as follows:

$$d=0.08*W, \quad (1.1)$$

$$l=0.7*W, \quad (1.2)$$

$$h=0.7*H, \quad (1.3)$$

where "d" is the distance from the boundaries of mask 400 to the boundaries of the image, "l" and "h" are the width and the height of mask 400, respectively, and "W" and "H" are the width and the height of the image, respectively. Step 306 is followed by step 308.

In step 308, the device starts to loop the search window throughout mask 400 to detect facial area candidates. The location of the search window is based on its center pixel. Depending on the results of various filters, the search window is either accepted or rejected as a facial area candidate. Step 308 is followed by step 310.

In step 310, the device determines if the center pixel of the search window is a skin color pixel based on the skin mask generated in step 303. If so, then the search window is a possible facial area candidate and step 310 is followed by step 312 where the search window is passed to the 3-rectangle filter. Otherwise the search window is rejected and step 310 is followed by step 320 (FIG. 3B).

Figure 7:
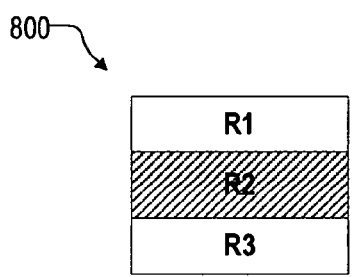
FIG. 7 illustrates a 3-rectangle filter in one embodiment of the invention.

In step 312, the device applies a 3-rectangle filter 800 (FIG. 7) to each of the pixels in the search window (e.g., search window 802 in FIG. 8) and determines if the average of the results is within a range of thresholds. If so, then the search window is a possible facial area candidate and step 312 is followed by step 314 where the search window is passed to the 4-rectangle filter. Otherwise the search window is rejected and step 312 is followed by step 320 (FIG. 3B). One embodiment of step 312 is described later in reference to FIGS. 7, 8, and 9.

In step 314, the device applies a 4-rectangle filter 1000 (FIG. 10A) to the pixels in the search window (e.g., search window 802 in FIG. 10B) and determines if the result is greater than a threshold. If so, then the search window is a possible facial area candidate and step 314 is followed by step 316 where the search window is passed to the AdaBoost classifier. Otherwise the search window is rejected and step 312 is followed by step 320 (FIG. 3B). One embodiment of step 314 is described later in reference to FIGS. 10A, 10B, and 11. Although FIG. 3A shows that steps 310, 312, and 314 performed in a particular order, these steps can be performed in any order to reject the search window.

In step 316, the device applies a conventional AdaBoost filter to the search window. The AdaBoost filter is described in "Robust Real-Time Object Detection" by Viola and Jones. If the AdaBoost filter determines that the search window is a facial area candidate, then step 316 is followed by step 318 (FIG. 3B). Otherwise step 316 is followed by step 320 (FIG. 3B). Note that the AdaBoost filter determines a minimum difference to a threshold for the search window.

Referring to FIG. 3B, in step 318, the device saves the search window as a facial area candidate in memory. Specifically, the device saves the coordinates of the center pixel and the minimum difference to the threshold determined in the AdaBoost filter to be used later to select a facial area from the facial area candidates. Step 318 is followed by step 320.

In step 320, the device moves the search window to the next location on the image. Instead of an exhaustive pixel by pixel search, the device moves the search window in response to the result of the above steps. If a facial area candidate has been identified at the previous location of the search window, then the device moves the search window by 3 pixels in the x-direction. Otherwise the device moves the search window by 1 pixel in the x-direction. After an entire row has been searched, the next row is searched. Step 320 is followed by step 322.

In step 322, the device loops back to step 308 to search the image at the new location of the search window until the entire mask 400 has been searched. When the entire mask 400 has been searched, step 322 is followed by step 324.

In step 324, the device loops back to step 304 to search the image with the search window at a new size until the size of the search window exceeds the size of the image. When the size of the search window exceeds the size of the image, step 324 is followed by step 326.

In step 326, the device determines if there are any facial area candidates. If there is not one facial area candidate, then step 326 is followed by step 327. Otherwise step 326 is followed by step 330.

In step 327, the device determines if the scale factor has been previously adjusted. If so, then step 327 is followed by step 330. Otherwise step 327 is followed by step 328.

In step 328, the device reduces the scale factor (e.g., from 1.2 to 1.1). Step 328 is followed by step 304 where the device repeats the above steps to find facial area candidates in the image.

In step 330, the device performs post-processing to select a facial area from the facial area candidates. One embodiment of the post-processing is described later in reference to FIG. 12. Note that if the device has no found at least one facial area candidate, then the device informs the user that it has failed to automatically detect a face on the image.

Skin Filters

One embodiment of step 303 (FIG. 3A) uses a skin color filter defined as follows:

$$m(x) = \begin{cases} 1 & r(x) > b(x) + k1 \ \& \ r(x) > g(x) + k2 \\ 0 & \text{others} \end{cases}, \quad (2.0)$$

where "m(x)" is the result of the skin color filter applied to a pixel "x", "r(x)", "g(x)", and "b(x)" are the RGB components of pixel x, and "k1" and "k2" are constants determined from experience. In one embodiment, constants k1 and k2 are set to 0. While the definition of this skin color model is loose, the computation of this model is simple and does not adversely affect the accuracy of the final result.

One embodiment of step 303 (FIG. 3A) uses a skin color filter based on a trainable skin color model defined in the YCrCb space. This model may assume that the camera properties are known, and the lighting conditions are average (neither too bright nor too dark). A skin color filter may be constructed based on this model using features such as Y, Cb, Cr, Y+Cb, Y+Cr, Cb+Cr, Y−Cb, Y−Cr, and Cb−Cr. These features are quick to calculate and can be boosted into a "strong" filter by combining these features.

The skin color filter can employs a binary-tree-like framework in which each weak classifier is trained to divide between skin and non-skin color pixels. Based on the response a pixel gets on one classifier, it can move on to the next classifier according to predefined route, or be accepted or rejected as a skin color pixel when it arrives at a leaf node. By selecting several suitable features, a set of simple classifiers can be created by providing them with respective thresholds and combining their response by accumulating the weights of those features that give positive responses at an incoming pixel. If the resulting value is larger than the final threshold, the pixel is accepted as a skin color pixel. Otherwise the pixel is rejected.

One embodiment of step 303 (FIG. 3A) includes steps to eliminate areas in the image that are least likely to contain any skin regions. The device determines vertical and horizontal histograms of the image generated in step 302 (FIG. 3A) by calculating the number of pixels that are classified as having skin color in each row and each column. The determination of the histograms is accelerated through the use of the integral image. The device then groups contiguous columns each with skin pixels less than 5% all the pixels in the image into sub-areas along the x direction, and contiguous rows each with skin pixels less than 5% all the pixels in the image into sub-areas along the y direction. To avoid falsely rejecting skin color pixels, only sub-blocks in the image having both rows and columns that are less than 5% skin color pixels are discarded. At the same time, the ratio between the height and the width of each sub-block is compared with a threshold to reject blocks that are too narrow to be a face. The remaining sub-blocks are assumed to have skin color pixels. In order to make sure that all skin color pixels are included, the remaining sub-blocks are enlarged by 0.2 times in both the x and the y directions.

Figure 3C:
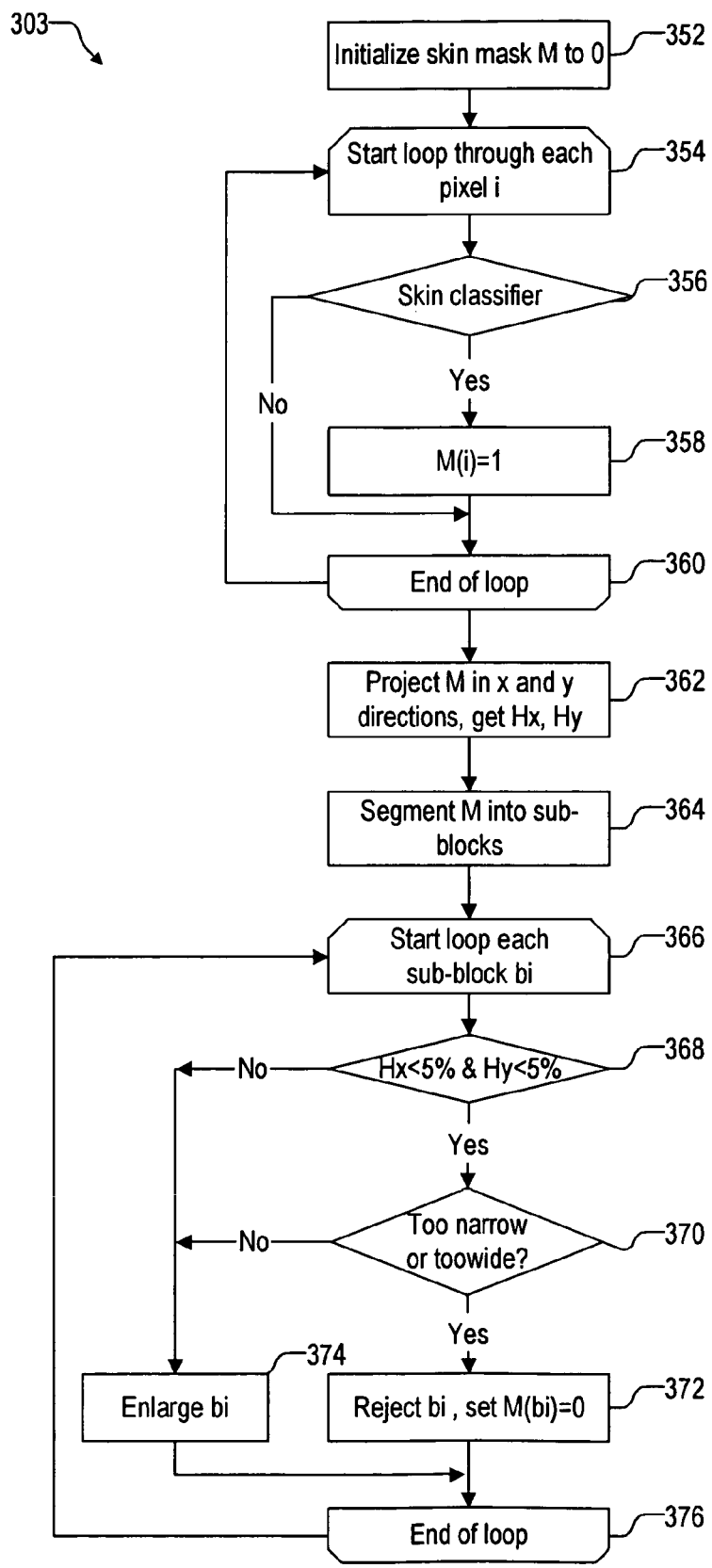
FIG. 3C is a flowchart for a method to discard areas without skin color pixels in an image in one embodiment of the invention.

This embodiment of step 303 is illustrated in FIG. 3C. In step 352, the device initializes a skin mask "M" of the image to 0. Step 303 is followed by step 354.

In step 354, the device starts to loop through each pixel "i" in the image. Step 354 is followed by step 356.

In step 356, the device applies a skin color filter to pixel i. The skin color filter can be any skin color filter, including the two skin color filters described above. If the device determines that pixel i is a skin color pixel, then step 356 is followed by step 358. Otherwise step 356 is followed by step 360.

In step 358, the device sets the corresponding point M(i) in mask M to 1. Step 358 is followed by step 360.

In step 360, the device loops back to step 354 to classify another pixel in the image until all the pixels in the image have been classified. When all the pixels in the image have been classified, then step 358 is followed by step 362.

In step 362, the device projects mask M in the x and y directions and calculates histogram "Hx" and "Hy", respectively. Histogram Hx represents the number of skin color pixels in each column while histogram Hy represents the number of skin color pixels in each row. Step 362 is followed by step 364.

In step 364, the device segments mask M into sub-blocks. The device first groups the columns with less than 5% skin color pixels into sub-areas in the x direction, and the rows with less than 5% skin color pixels into sub-areas in the y direction. The device then segments mask M into sub-blocks by the horizontal and vertical borders of the sub-areas. Step 364 is followed by step 366.

In step 366, the device starts to loop through each sub-block "bi". Step 366 is followed by step 368.

In step 368, the device determines if the Hx value of each column in sub-block bi is less than 5% skin pixel, and if the total Hy value of each row in sub-block bi is less than 5% skin pixel. If so, then step 368 is followed by step 370. Otherwise step 368 is followed by step 374.

Alternatively, the device determines if the total Hx value of the columns in sub-block bi is less than 5% skin pixel, and the total Hy value of the rows in sub-block bi is less than 5% skin pixel. If so, then step 368 is followed by step 370. Otherwise step 368 is followed by step 374.

In step 370, the device determines if sub-block bi is too narrow or too wide. Sub-block bi is too narrow when its height to width ratio is greater than a threshold. Sub-block bi is too wide when its width to height ratio is greater than a threshold. In one embodiment, the threshold is set at 3. If sub-block bi is too narrow or too wide, then step 370 is followed by step 372. Otherwise step 370 is followed by step 374.

In step 372, the device rejects sub-block bi because it is not likely to contain any skin region. The device rejects sub-block bi by setting all the pixels in sub-block bi to 0 in mask M. Step 372 is followed by step 376.

In step 374, the device accepts sub-block bi as a skin region and enlarges sub-block bi by a predetermined amount in the x and y directions. In one embodiment, sub-block bi is enlarged by 0.2 times in the y and y directions. Step 374 is followed by step 376.

In step 376, the device loops back to step 366 to select another sub-block until all the sub-blocks in the image have been accepted or rejected.

Figure 5:
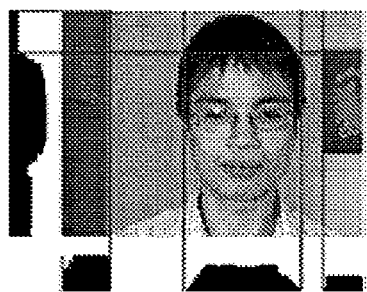
FIGS. 5 and 6 illustrate the application of the method of FIG. 3C in one embodiment of the invention.
Figure 6:

The application and the result of the above described skin region detection process is illustrated in FIGS. 5 and 6. In FIG. 5, the dark areas on the bottom and the left of the image are the projection of skin color pixels in the x and y directions, respectively. FIG. 6 illustrates a sub-block (shown as white lines around the facial area on the image) that has been accepted as a skin region and subsequently enlarged.

3-Rectangle Filter

The human face consists of eyes, nose, mouth, and other features. Strong intensity inconsistency exists between and within these features. Due to the unique appearance of human faces, the distribution of the intensity inconsistency also presents a special property. Thus, a 3-rectangle filter 800 (FIG. 7) is applied to the pixels in the search window to measure the intensity inconsistency in the search window.

Figure 8:
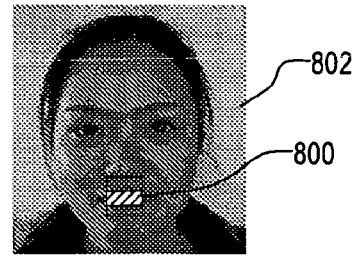
FIG. 8 illustrates the application of the 3-rectangle filter to detect a facial area candidate in one embodiment of the invention.

3-rectangle filter 800 consists of three equal rectangles that are cascaded vertically. FIG. 8 shows that 3-rectangle filter 800 fits the mouth region in a facial area very well. A middle rectangle R2 of filter 800 corresponds to the lips of the mouth while rectangles R1 and R3 correspond to the areas above and below the lips, respectively. Applying 3-rectangle filter 800 to the mouth region as shown in FIG. 8 results in a high value. In one embodiment, rectangles R1, R2, and R3 each consists of a 4 by 8 pixel rectangle.

In one embodiment, 3-rectangle filter 800 is applied as follow:

$$E(x) = \sum_{i \in R1} I(i) + \sum_{j \in R2} I(j) - 2\sum_{k \in R2} I(k), \quad (3.0)$$

where "E(x)" is the result of applying 3-rectangle filter 800 to a pixel "x" of the search window located at the center of the filter, "I" is the image intensity of a pixel, "i" represents the pixels in rectangle R1, "j" represents the pixels in R3, and "k" represents the pixels in rectangle R2. When used with the integral image, E(x) can be computed rapidly with 3 additions, 4 subtractions, and 1 multiplication.

FIG. 9 is a flowchart of step 312 of FIG. 3A to apply 3-rectangle filter 800 in one embodiment of the invention.

In step 902, the device determines the values of 3-rectangle filter 800 applied to all the pixels in the search window.

In step 904, the device determines if the search window is a possible facial area candidate as follows:

$$M(x) = \begin{cases} 1 & th2 > \frac{1}{N}\sum_{i \in N_x} E(i) > th1 \\ 0 & others \end{cases} \quad (4.0)$$

where "M(x)" is the result of applying 3-rectangle filter 800 to pixels "Nx" in the search window, "i" represents a pixel in the search window, "N" is the number of pixels in the search window, and "th1" and "th2" are two predefined thresholds. In one embodiment, thresholds th1 and th2 are 3 and 12, respectively.

If the average of the results of applying 3-rectangle filter 800 to the pixels in the search window is within the predefined threshold (i.e., if M(x)=1), then step 904 is followed by step 906. Otherwise step 904 is followed by step 908.

In step 906, the device determines that the search window is a possible facial area candidate and passes the search window for further processing.

In step 908, the device discards the search window as a non-face patch.

4-Rectangle Filter 4-rectangle filter 1000 (FIG. 10A) utilizes image intensity distribution in the human face to model the eye region. The eye region is considered to be one of the most discriminating features of the human face. Prior studies exploring different facial features for face recognition claim a hierarchy with the eyes as the most important feature, followed by the mouth and the nose.

4-rectangle filter 1000 is based on the fact that the eye region presents lower intensity than the areas below them. 4-rectangle filter 1000 consists of a first pair of vertically cascaded rectangles r1 and r3, and a second pair of vertically cascaded rectangles r2 and r4. The upper two rectangles r1 and r2 represent two eye regions. The lower two rectangles r3 and r4 represent parts of the face below the eyes. The two pairs of cascaded rectangles are spaced apart by a distance d. The position of 4-rectangle filter 1000 in a search window is defined by the top-left corner of rectangle r1. In one embodiment where the search window has an initial size of 20 by 20 pixels, rectangles r1 to r4 are 4.5 by 5 pixels, distance d is 4 pixels, and the coordinates of the top-left corner of rectangle r1 are (3, 3). Note that rectangles r1 to r4 and their positions are scaled along the search window when the search window is scaled.

FIG. 10B illustrates a facial area superimposed by 4-rectangle filter 1000 where the two eyes are located in the upper two rectangles. Due to the dark pupils and eyelashes, the intensities of the upper two rectangles are much lower than the lower two rectangles. Even when a person wears eyeglasses and the eyeglasses have light spots on them, this intensity distribution condition is still evident.

FIG. 11 is a flowchart of step 314 for applying 4-rectangle filter 1000 in one embodiment of the invention.

In step 1101, the device computes the position and the size of rectangles r1, r2, r3, and r4 of 4-rectangle filter 1000 as described above. Step 1101 is followed by step 1102.

In step 1102, the device computes the sum of the pixel intensities in rectangles r1 and r2 (i.e., r1∪r2), and the sum of the pixel intensities in rectangles r3 and r4 (i.e., r3∪r4). Using the integral image, each sum can be computed by 3 additions and 4 subtractions.

In step 1104, the device determines if the search window is a possible facial area candidate as follows:

$$M(x) = \begin{cases} 1 & \sum_{i \in r1 \cup r2} I(i) < \sum_{j \in r3 \cup r4} I(j) \\ 0 & \text{others} \end{cases} \quad (5.0)$$

where "M(x)" is result of applying 4-rectangle filter 1000 about a center pixel "x" of the search window, "i" represents pixels in the union of rectangles r1 and r2, "j" represents pixels in the union of rectangles r3 and r4, and "I" is the image intensity at a pixel.

If the sum of the intensities of rectangles r1 and r2 is less than the sum of the intensities of rectangles r3 and r4 (i.e., if M(x)=1), then step 1104 is followed by step 1106. Otherwise step 1104 is followed by step 1108.

In step 1106, the device determines that the search window is a possible facial area candidate and passes the search window for further processing.

In step 1108, the device discards the search window as a non-face patch.

Post-Processing of Face Detection

Figure 12:
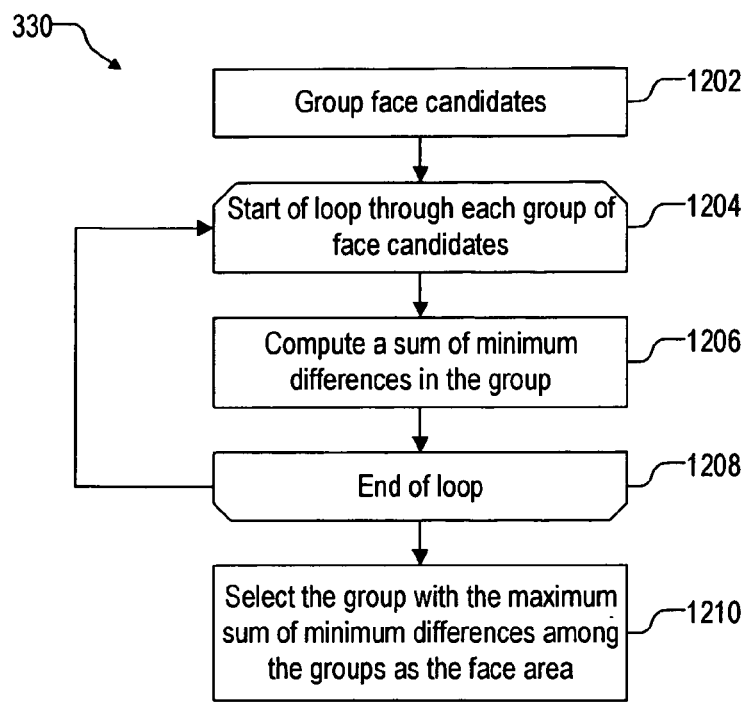
FIG. 12 is a flowchart for post-processing the facial area candidates to select a facial area from facial area candidates in the method of FIG. 3B in one embodiment of the invention.

FIG. 12 is a flowchart of step 330 (FIG. 3B) for post-processing the facial area candidates in one embodiment of the invention.

In step 1202, the device puts the facial area candidates in groups according to their coordinates. In one embodiment, the device uses a grouping function called afPartitionSeq( ) from the Open Source Computer Vision Library available from Intel of Santa Clara, Calif. For each group, the function forms a group candidate with a bounding box. Step 1202 is followed by step 1204.

In step 1204, the device starts to loop through each of the groups formed in step 1202.

From experience, the face is located in the group that has the largest sum of the minimum differences determined by the AdaBoost filter in step 316 (FIG. 3A). Thus, in step 1206, the device computes the sum of the minimum differences in the group. Step 1206 is followed by step 1208.

In step 1208, the device loops back to step 1204 to process another group until all the groups have been processed. When all the groups have been processed, step 1208 is followed by step 1210.

In step 1210, the device selects the group with the largest sum of minimum differences as the group containing the face in the image. Then, the bounding box of the group candidate is returned as the facial area.

Result of Face Detection

Figure 13A:
FIGS. 13A and 13B compares the results of applying the method of FIGS. 3A/B and a conventional AdaBoost filter to detect a facial area in one embodiment of the invention.
Figure 13B:
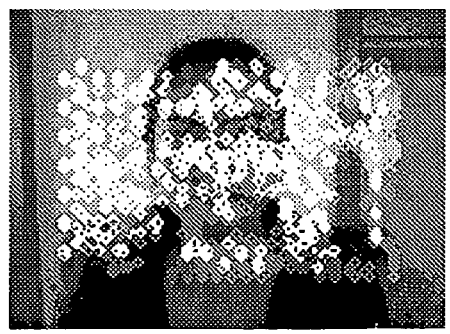

Compare to the original AdaBoost filter, the present invention with the three filters takes less computation and is thus faster. FIGS. 13A and 13B compare the results of negative samples rejected by the first two layers of AdaBoost filter with and without the three filters, respectively. The circles in the images represent the centers of the facial area candidates.

It can be seen that the number of facial area candidates detected with the three filters in FIG. 13A is much smaller than the original AdaBoost face detection in FIG. 13B. This means that the rejection rate of the three filters is much higher than that of the first two layers of the AdaBoost filter. Thus, computation redundancy has been reduced. Moreover, since the integral image has been computed for the AdaBoost algorithm, it takes only a few operations to evaluate the three filters. The time consumed by the three filters is much less than the time it takes for the first two layers of the AdaBoost based classifiers.

Although the three filters reject a large number of facial area candidates, the detection rate is nearly unchanged. This is because most of the candidates rejected are background patches that have non-skin colors or cannot match the intensity inconsistency or distribution of the human face. Hence, discarding these background patches will not change the detection rate greatly. At the same time, because more background patches are rejected by the three filters, the false detection rate is reduced to some extent.

Feature Detection

Figure 14:
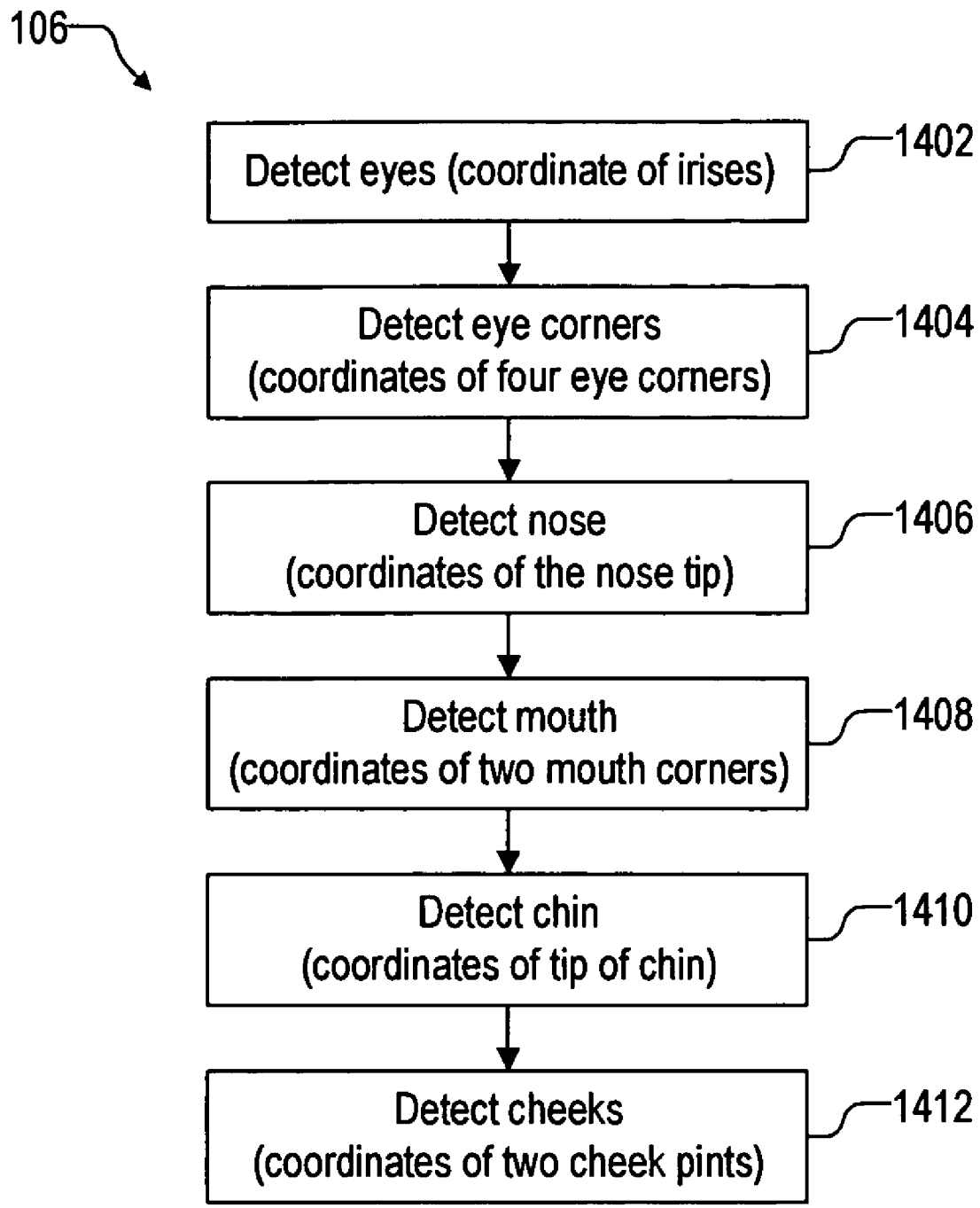
FIG. 14 is a flowchart for detecting facial features from a facial area in the method of FIG. 1 in one embodiment of the invention.

FIG. 14 is a flowchart of step 106 (FIG. 1) for detecting facial features on the facial area received from step 104 (FIG. 1) in one embodiment of the invention.

In step 1402, the device detects the eyes on the facial area. Specifically, the device determines the coordinates of the irises. One embodiment of step 1402 is described later in reference to FIGS. 15, 16A, and 16B.

In step 1404, the device detects the eye corners on the facial area. Specifically, the device determines the coordinates of two eye corners for each eye. One embodiment of step 1404 is described later in reference to FIGS. 17, 18, 19, and 20.

In step 1406, the device detects the nose on the facial area. Specifically, the device determines the coordinates of the tip of the nose. One embodiment of step 1406 is described later in reference to FIGS. 21, 22A, and 22B.

In step 1408, the device detects the mouth on the facial area. Specifically, the device determines the coordinates of the two corners of the mouth. One embodiment of step 1408 is described later in reference to FIGS. 23, 24A, 24B, 25, and 26.

In step 1410, the device detects the chin on the facial area. Specifically, the device determines the coordinates of the tip of the chin. One embodiment of step 1410 is described later in reference to FIGS. 27, 28, 29, 30, and 31.

In step 1412, the device detects the cheeks on the facial area. Specifically, the device determines the coordinates of the two cheek points. One embodiment of step 1412 is described later in reference to FIGS. 32, 33, 34, and 35.

Eyes Detection

FIG. 15 is a flowchart of step 1402 (FIG. 14) for detecting the eyes on the facial area in one embodiment of the invention.

In step 1502, the device estimates the location of an eye slice on the facial area based on the size of the facial area. The eye slice is a slice of the facial area containing two eyes. FIGS. 16A and 16B illustrate the estimation of an eye slice 1602. The crosses in eye slice 1602 represent the eyes on a face. The eye slice can be estimated as follows:

$$ULx = W^* EyeX - W^* EyeW/2, \quad (6.1)$$

$$ULy = H^* EyeY - H^* EyeH/2, \quad (6.2)$$

$$DRx = W^*(1 - EyeX) + W^* EyeW/2, \quad (6.3)$$

$$DRy = H^* EyeY + H^* EyeH/2, \quad (6.4)$$

where "W" and "H" are respective width and height of the facial area normalized to 1, "ULx" and "ULy" are respective x and y coordinates of a top left corner of the eye slice, "EyeW" is a width of one eye set equal to 0.45, "EyeH" is a height of one eye set equal to 0.3, "EyeX" is an x coordinate of a center of a left eye set equal to 0.315, "EyeY" is a y coordinate of the center of the left eye set equal to 0.344, and "DRx" and "DRy" are respective x and y coordinates of a bottom right corner of the eye slice.

In step 1504, the device applies a 3-rectangle filter to all the pixels in the eye slice to generate an intensity response map. The 3-rectangle filter measures the intensity inconsistency in the eye slice. In one embodiment, the 3-rectangle filter uses cascaded 6 by 4 rectangles and equation 3.0 to generate an intensity response map. The result will filter out the information in smooth area with consistent colors and strengthen the intensity inconsistency in areas around the contours of the eye.

In step 1506, the device applies a conventional K-mean clustering algorithm to the intensity response map generated in step 1504 to estimate the centers of the eyes. The K-mean clustering algorithm groups objects based on features into "K" number of clusters. As applied here, K is set to 2 for the two eyes. During the clustering process, the distances from the two centers to each sample are weighted by its corresponding response in the intensity response map. As the K-mean clustering converges, the two centers of the cluster are estimated locations of the eyes.

In step 1508, the device splits the eye slice generated in step 1502 into two eye patches according to the estimated locations of the eyes so that each patch contains on eye. Furthermore, the device reverses the right eye patch to generate a mirror image of the right eye patch.

In step 1510, the device applies an AdaBoost based eye filter to the eye patches to identify the eyes. Assuming symmetry between the left and the right eyes, the AdaBoost based eye filter is trained with only left eye samples. In step 1510, the left eye patch and the mirror image of the right eye patch are searched to detect the eyes. The search may result in several eye candidates for each eye patch.

In step 1512, the device groups the eye candidates in each eye patch into groups and then selects the group with the largest sum of minimum differences as the iris of the eye in that eye patch. The coordinates of the group candidate of the selected group are set as the coordinates of the iris. This is similar to step 330 shown in FIG. 12. The coordinates of the irises are later used in step 1404 to detect the eye coordinates.

Eyes Corner Detection

Figure 17:
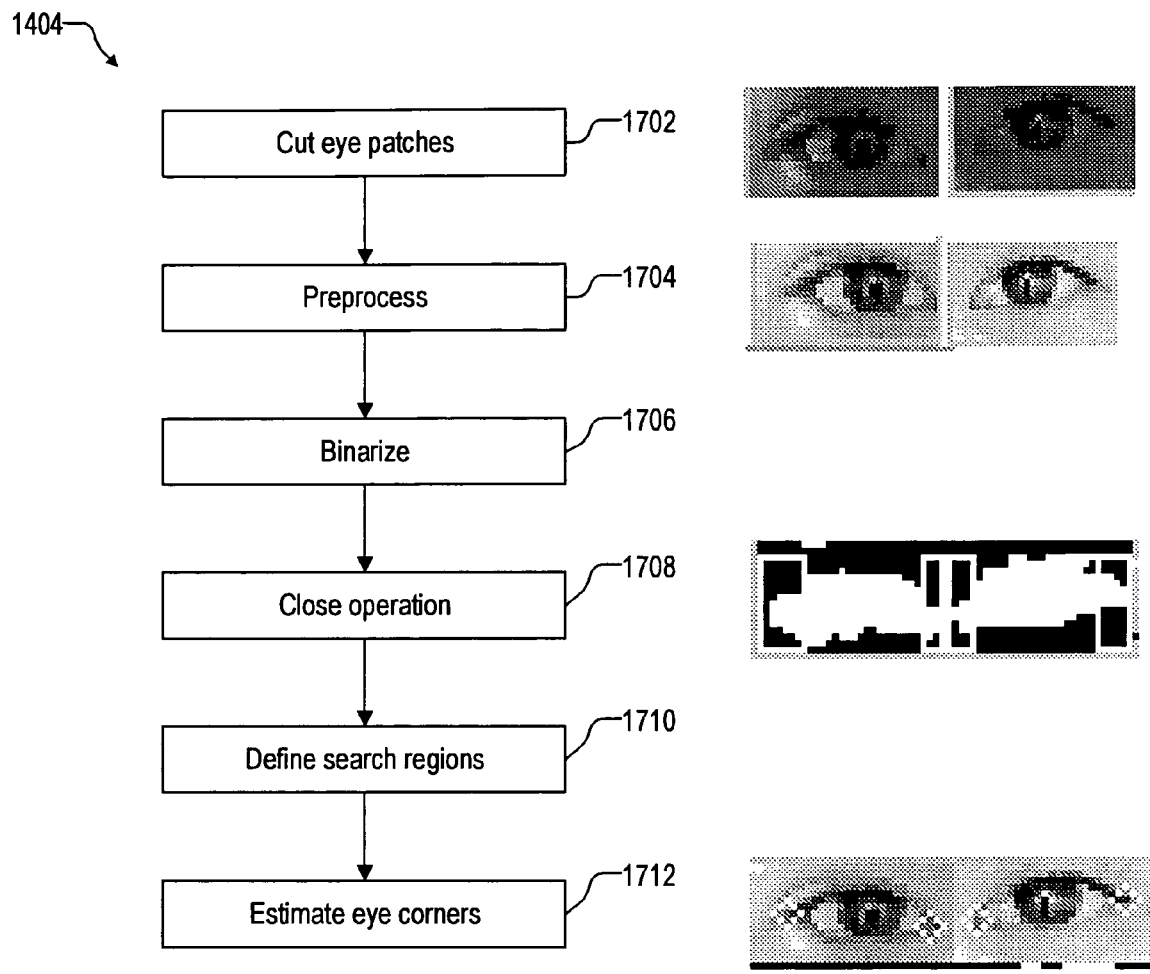
FIG. 17 is a flowchart with accompanying images of a method for detecting eye corners from a facial area in the method of FIG. 14 in one embodiment of the invention.

FIG. 17 is a flowchart of step 1404 (FIG. 14) for detecting the eye corners in one embodiment of the invention. Due to the intensity inconsistency between the white of the eye and the dark eye lashes of the eye, the eye corners present strong corner properties.

In step 1702, the device cuts two eye patches from the facial area using the coordinates of the irises determined in step 1402 (FIG. 14). Each eye patch is centered on one eye and is defined as follows:

$$w = ELen^* 0.6, \quad (7.1)$$

$$h = ELen^* 0.3, \quad (7.2)$$

where "w" and "h" are the width and the height of the eye patch, respectively, and "ELen" is the distance between the irises.

In step 1704, the device preprocesses the eye patches by applying logarithm transformation and grayscale stretching to correct the lighting conditions. One embodiment of step 1704 is described later in reference to FIG. 18.

Through experience, it is known that the intensities of the eye corners are usually darker than the eye lids due to the dark color of the eye lashes and shading. Thus, the device uses binarization to estimate the positions of the eye corners.

In step 1706, the device binarizes the eye patches generated in step 1704 to form binary masks of the eye patches. One embodiment of step 1706 is described later in reference to FIG. 19.

In step 1708, the device performs a conventional close operation to fill up any holes in the binary masks generated in step 1706. The close operation is a mathematic morphological operation that removes dark spots ("0" pixels) from bright regions (regions of "1" pixels). In one embodiment, the close operation uses a 3 by 3 square template of 1's.

In step 1710, the device defines the size of the search regions for the eye corners on each eye patch as follows:

$$w = Elen^* 0.2, \quad (8.1)$$

$$h = Elen^* 0.3, \quad (8.2)$$

where "w" and "h" are the width and the height of an eye corner search region, respectively, and "ELen" is the distance between the irises. For each eye patch, there is a left eye corner search region and a right eye corner search region. The device determines the locations of the eye corner search regions on the eye patches generated in step 1704 based on the binary mask generated in step 1708. A left eye corner search region is centered about the left most pixel of the white pixels in the binary mask while a right eye corner search region is centered about the right most pixel of the white pixels in the binary mask. When a search region exceeds the eye patch, it is trimmed.

In step 1712, the device estimates the eye corners from the left and the right eye corner search regions for each eye patch. One embodiment of step 1712 is described later in reference to FIG. 20.

Eye Patch Preprocessing Using Logarithm Transform and Grayscale Stretching

Figure 18:
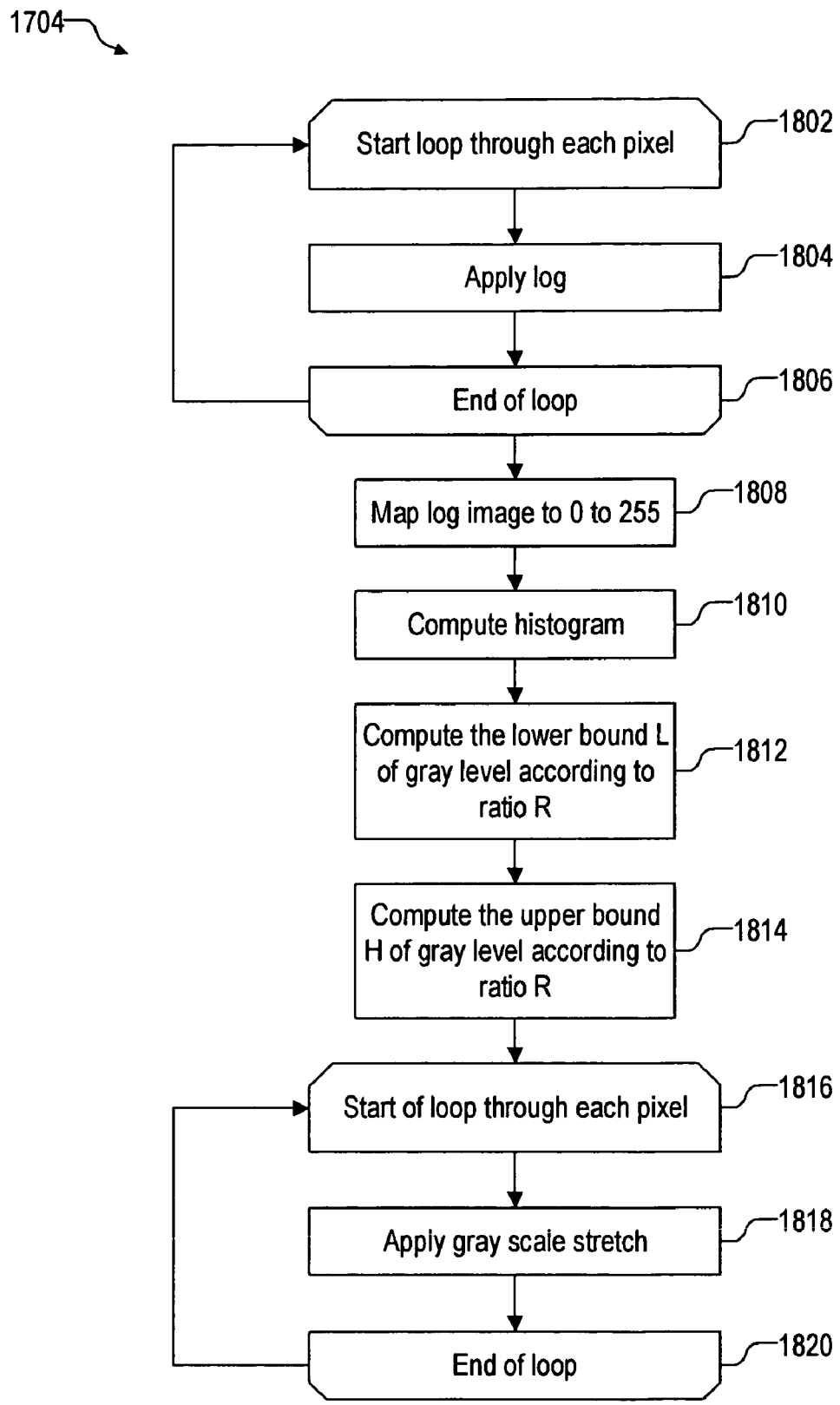
FIG. 18 is a flowchart of a method for preprocessing an eye patch in the method of FIG. 17 in one embodiment of the invention.

FIG. 18 is a flowchart of step 1704 (FIG. 17) for preprocessing an eye patch in one embodiment of the invention.

In step 1802, the device starts to loop through each pixel of the eye patch. Step 1802 is followed by step 1804.

In step 1804, the device applies a logarithm transform to the pixel as follows:

$$Y(x) = \log(I(x)+1), \quad (9.0)$$

where "x" represents a pixel, and "I" and "Y" represent the intensities before and after the transformation, respectively. Note that intensity Y is a floating point number. Step 1804 is followed by step 1806.

In step 1806, the device loops back to step 1802 to process another pixel until all the pixels in the eye patch have been processed. When all the pixels in the eye patch have been processed, step 1806 is followed by step 1808.

In step 1808, the device maps the floating point intensity Y value of each pixel to a value between 0 and 255 as follows:

$$Y' = (Y - \min_y) * 255 / (\max_y - \min_y), \quad (10.0)$$

where "Y'" is a mapped intensity value of floating point intensity Y, and "$\max_y$" and "$\min_y$" represent the maximum and the minimum values of the Y values in the eye patch, respectively. Step 1808 is followed by step 1810.

In step 1810, the device computes the histogram of the eye patch using 0 to 255 bins of gray levels. Step 1810 is followed by step 1812.

In step 1812, the device computes the lower bound "L" intensity value for the grayscale (contrast) stretching. Given a ratio "R" for grayscale stretching, the lower bound L is defined as follows:

$$L = \operatorname*{argmin}_i \left\{ \sum_i H(i) > N * R \right\}, \quad (11.0)$$

where "H(i)" is the histogram value of an intensity value "i", "N" is the number of pixels in the eye patch, and "arg min" is the minimum of all the values that meet the conditions specified between { }. In one embodiment, ratio R ranges from 1.5 to 2.0. Step 1812 is followed by step 1814.

In step 1814, the device computes the upper bound "H" intensity value for the grayscale stretching as follows:

$$H = \operatorname*{argmin}_i \left\{ \sum_i H(i) > N * (1-R) \right\}. \quad (12.0)$$

Step 1814 is followed by step 1816.

In step 1816, the device starts to loop through each pixel in the eye patch. Step 1816 is followed by step 1818.

In step 1818, the device applies grayscale stretching to each pixel as follows:

$$I'(x) = (Y(x) - L) * 255 / (H - L), \quad (13.0)$$

where "I'" represents the new intensity after the preprocessing, and "x" represents the coordinates of the pixel.

In step 1820, the device loops back to step 1816 to process another pixel until all the pixels in the eye patch have been processed.

Eye Patch Binarization

Figure 19:
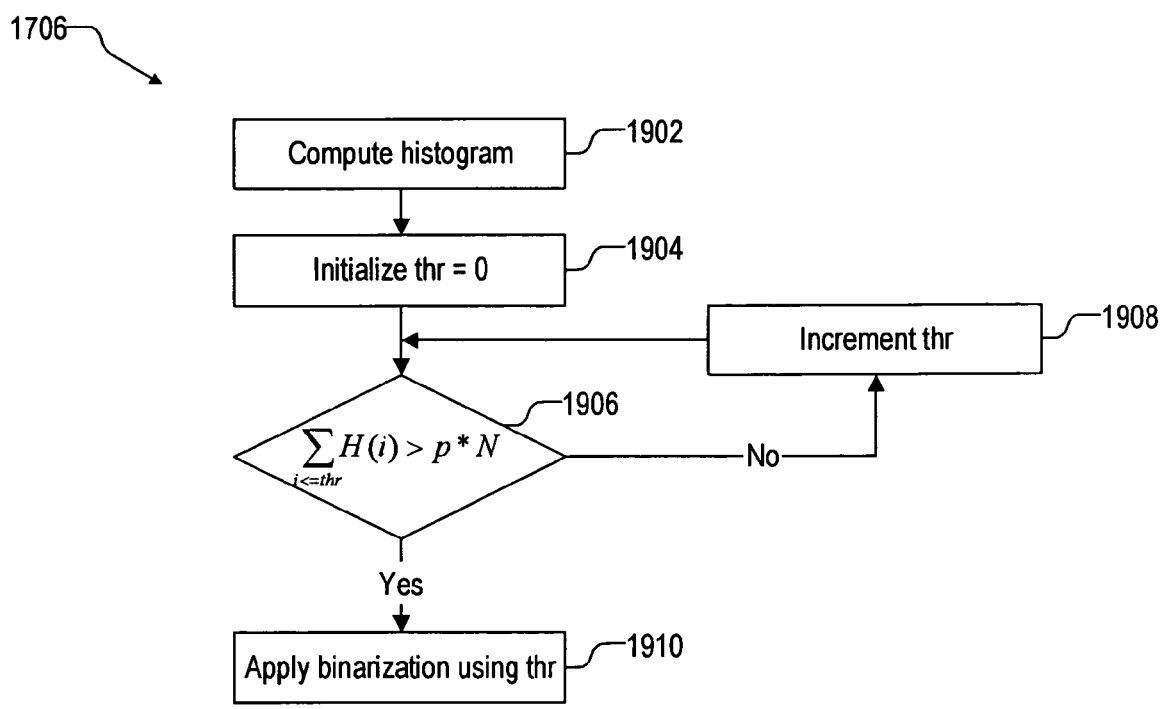
FIG. 19 is a flowchart of a method for binarizing an eye patch in the method of FIG. 17 in one embodiment of the invention.

FIG. 19 is a flowchart of step 1706 (FIG. 17) for binarizing an eye patch in one embodiment of the invention.

In step 1902, the device computes the histogram H(i) of the eye patch using 0 to 255 bins of gray levels. Step 1902 is followed by step 1904.

In step 1904, the device initializes a binarization threshold "thr" to zero.

The device calculates threshold thr using a percentage "p". In one embodiment, percentage p is set to 70% from experience. Given a total number "N" of pixels in the eye patch, threshold thr is defined as follows:

$$thr = \operatorname*{argmin}_i \left\{ \sum_{j \le i} H(j) >= p * N \right\}, \quad (14.0)$$

where "i" is 0~255, and "j" is 0~255. The determination of threshold thr is performed in steps 1906 and 1908.

In step 1906, the device determines if the number of pixels having intensities from 0 to i is greater than percentage p of the total number N of pixels in the eye patch, where intensity i is set equal or less than threshold thr. If so, then step 1906 is followed by step 1910. Otherwise step 1906 is followed by step 1908.

In step 1908, the device increments threshold thr by 1. Step 1908 is followed by step 1906.

In step 1910, the device applies binarization to the eye patch using threshold thr to generate a binary mask. If the intensity of a pixel is greater than threshold thr, then the pixel is set equal to 1. If the intensity of a pixel is less than or equal to threshold thr, then the pixel is set equal to 0.

Estimating Eye Corners

Figure 20:
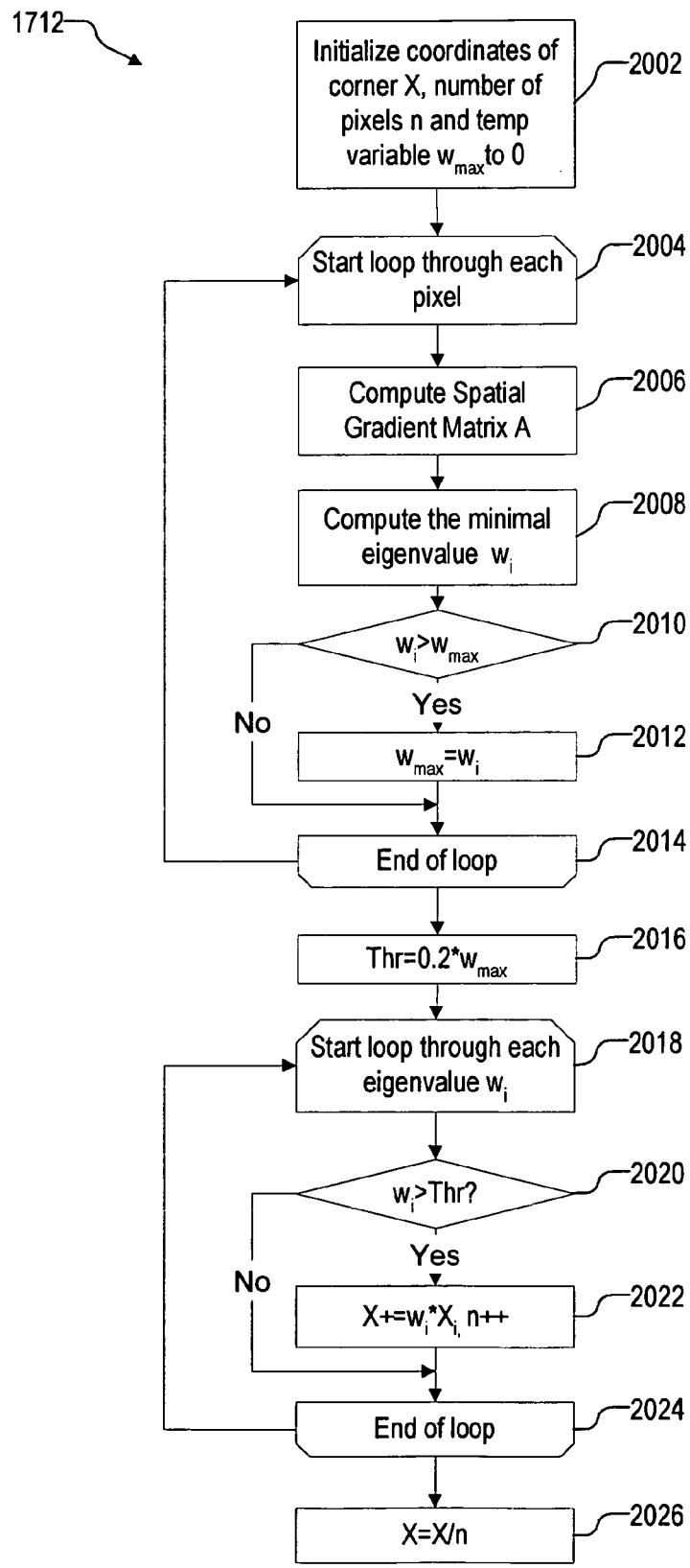
FIG. 20 is a flowchart of a method for estimating an eye corner in the method of FIG. 17 in one embodiment of the invention.

FIG. 20 is a flowchart of step 1712 (FIG. 17) for estimating an eye corner from an eye corner search region in one embodiment.

In step 2002, the device initializes the coordinates "X" of the eye corner, the number "n" of pixels in the eye corner search region, and a temporary variable "$w_{max}$" to 0.

In step 2004, the device starts to loop through each pixel in the eye corner search region.

In step 2006, the device computes a spatial gradient matrix "A" of a N by N neighborhood about a pixel "I" as follows:

$$A = \begin{bmatrix} \sum I_x^2 & \sum I_x I_y \\ \sum I_x I_y & \sum I_y^2 \end{bmatrix}, \quad (15.0)$$

where "$I_x$" and "$I_y$" represent the gradient of pixel I in x and y directions, respectively. In one embodiment, the neighborhood about pixel I is a 3 by 3 neighborhood. Matrix A is the covariance of the gradients in the 3 by 3 neighborhood. Step 2006 is followed by step 2008.

In step 2008, the device computes a minimum eigenvalue "$w_i$" of matrix A. Step 2008 is followed by step 2010.

In step 2010, the current minimum eigenvalue $w_i$ is compared with variable $w_{max}$ that tracks the maximum value of minimum eigenvalue $w_i$. If the current minimum eigenvalue $w_i$ is greater than variable $w_{max}$, then step 2010 is followed by step 2012. Otherwise step 2010 is followed by step 2014.

In step 2012, the device sets variable $w_{max}$ equal to the current minimum eigenvalue $w_i$. Step 2012 is followed by step 2014.

In step 2014, the device loops back to step 2004 to process another pixel in the eye corner search region until all the pixels in the eye corner search region have been processed. When all the pixels in the eye corner search region have been processed, step 2014 is followed by step 2016. At the end of this loop, there will be a minimum eigenvalue $w_i$ for each pixel in the eye corner search region.

In step 2016, a threshold "thr" is used to filter out the noisy information. In one embodiment, "thr" is set to 0.2 times variable $w_{max}$. Step 2016 is followed by step 2018.

In step 2018, the device starts to loop through each minimum eigenvalue $w_i$ computed in the earlier loop. Step 2018 is followed by step 2020.

In step 2020, the device determines if the current minimum eigenvalue $w_i$ is greater than threshold thr. If so, the corresponding pixel becomes a pixel used to determine the eye corner and step 2020 is followed by step 2022. Otherwise step 2020 is followed by step 2024.

In step 2022, the device increments eye corner coordinates X by coordinates "Xi" weighed by minimum eigenvalue $w_i$, where Xi represents the coordinates of the current pixel in the loop. The device also increments the number n of pixels by 1. In other words, $$X\mathrel{+}=w*Xi, \tag{16.1}$$

$$n\mathrel{+}\mathrel{+}. \tag{16.2}$$

Step 2022 is followed by step 2024.

In step 2024, the device loops back to step 2018 to process another minimum eigenvalue $w_i$ until all the minimum eigenvalues have been processed. When all the minimum eigenvalues have been processed, then step 2024 is followed by step 2026.

In step 2026, the device divides coordinates X by the number of pixels n. In other words, the coordinates of the eye corner are estimated as follows:

$$X = \frac{1}{n}\sum_{i \in R} w_i * X_i, \tag{17.0}$$

where "R" represents all the pixels in the eye corner search region.

Nose Tip Detection

Figure 21:
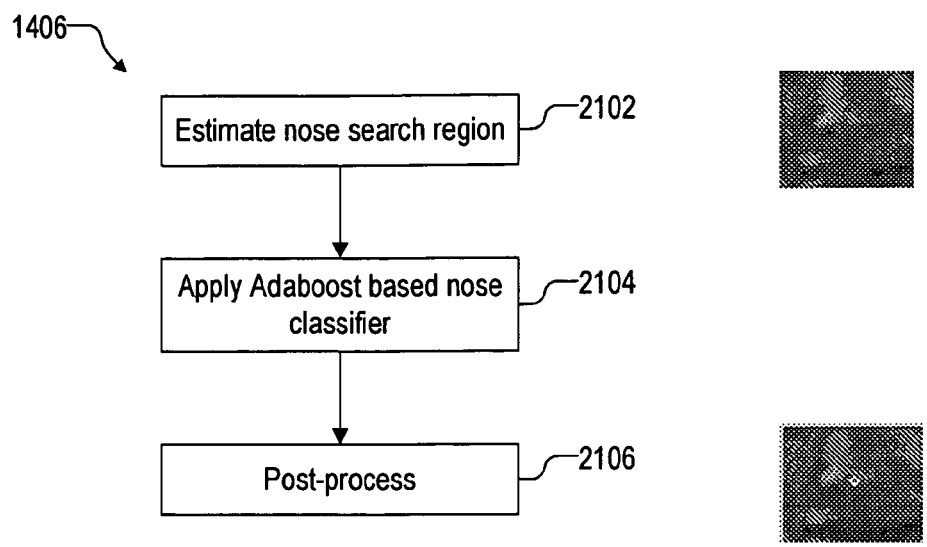
FIG. 21 is a flowchart with accompanying images of a method for detecting a nose tip from a facial area in the method of FIG. 14 in one embodiment of the invention.

FIG. 21 is the flowchart of step 1406 (FIG. 14) for detecting the nose tip from the facial area in one embodiment of the invention.

Figures 22A, 22B:
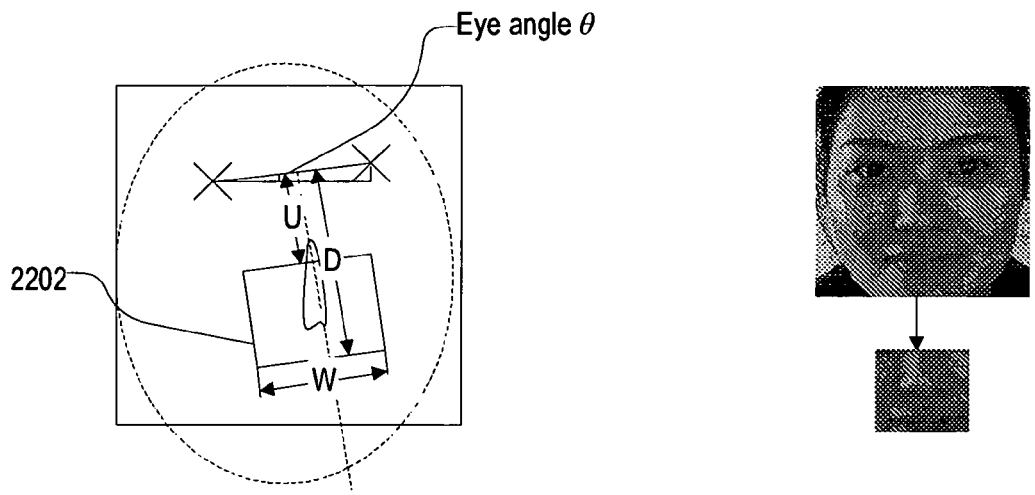
FIGS. 22A and 22B illustrate the estimation of a nose search region in one embodiment of the invention.

In step 2102, the device determines a nose search region 2202 (FIG. 22A) on the facial area based on the positions of the irises determined in step 1402 (FIG. 14). FIGS. 22A and 22B illustrate the estimation of the nose search region. Given the position of the two irises, a distance "Elen" between the irises and the rotation angle "θ" of the eyes are computed. As shown in FIGS. 22A and 22B, the nose should be located at the end of a line extending perpendicularly from the midpoint of a line connecting the two irises. Thus, the location of the nose search region is estimated from the coordinates of the irises, distance Elen between the irises, and rotation angle θ of the eyes. The width and the height of the nose search region are also estimated according to distance Elen between the irises. Considering the positions of the two irises may not be sufficiently accurate, the nose search region is defined large enough to include more than just the nose tip as follows:

$$U=0.2*Elen, \tag{18.1}$$

$$D=1.1*Elen, \tag{18.2}$$

$$W=Elen, \tag{18.3}$$

where "U" is the distance from the midpoint of the two irises to the top of nose search region 2202, "D" is the distance from the midpoint to the bottom of nose search region 2202, and "W" is the width of nose search region 2202.

In step 2104, the device applies an AdaBoost based nose filter to detect nose tip candidates. In order to detect the nose tip robustly, the training database should contain all kinds of nose samples. In one embodiment, the samples include noses with and without visible nostrils and noses with small variations in rotation.

In step 2106, the device groups the nose tip candidates in the nose search region into groups and then selects the group with the largest sum of minimum differences as the nose tip. The coordinates of the group candidate of the selected group are set as the coordinates of the nose tip. This is similar to step 330 shown in FIG. 12.

Mouth and Mouth Corners Detection

Figure 25:
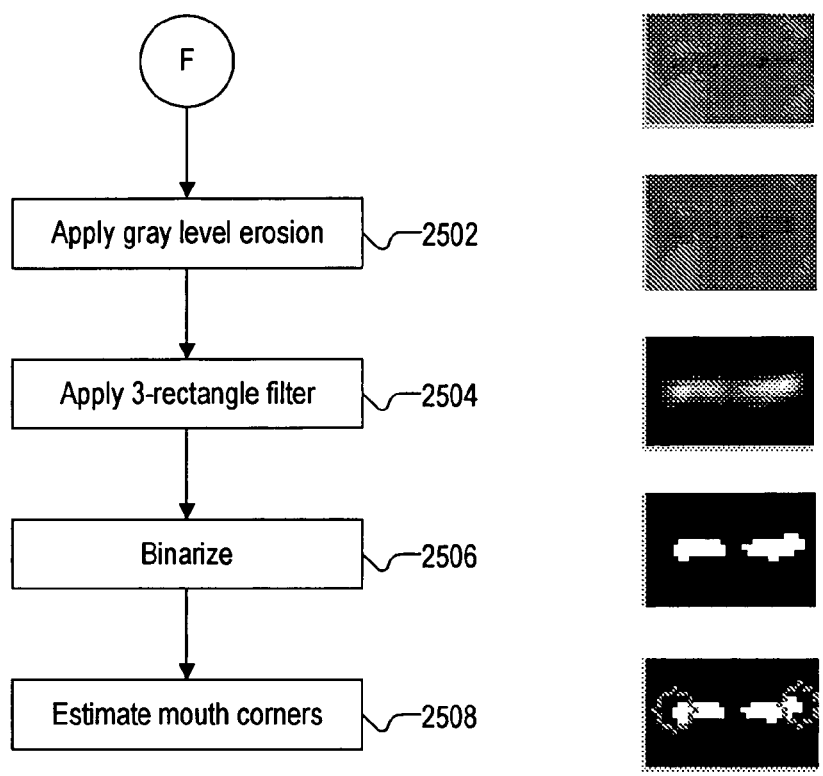
FIG. 25 is a flowchart with accompanying images that continue the method of FIG. 23 to detect mouth corners in one embodiment of the invention.

FIGS. 23 and 25 form a flowchart of step 1408 (FIG. 14) for detecting the mouth corners from the facial area in one embodiment of the invention. Parts of step 1408 illustrated in FIG. 23 are similar to step 1406 illustrated in FIG. 21 for nose tip detection.

Referring to FIG. 23, in step 2302, the device determines a mouth search region on the facial area based on the positions of the two irises and the size of the facial area. FIGS. 24A and 24B illustrate the estimation of a mouth search region 2402 (FIG. 24A). The mouth search region is defined as follows:

$$L=W*0.15, \tag{19.1}$$

$$R=W*0.85, \tag{19.2}$$

$$U=Elen*0.5, \tag{19.3}$$

$$D=Elen*1.8, \tag{19.4}$$

where "L" is the left margin from mouth search region 2402 to the left edge of the facial area, "W" is the width of the facial area, "R" is the right margin from mouth search region 2402 to the right edge of the facial area, "U" is the distance from the midpoint of the two irises to the top of mouth search region 2402, "Elen" is the distance between the two irises, and "D" is the distance from the midpoint to the bottom of mouth search region 2402.

In step 2304, the device applies an AdaBoost based mouth filter to detect mouth candidates. In order to detect the mouth, the training database includes mouths in different states. For example, the training samples include neutral mouths, opened mouths, closed mouths, slightly rotated mouths, smiling mouths, and angry mouths.

In step 2306, the device groups the mouth candidates into groups and then selects the group with the largest sum of minimum differences. This is similar to step 330 shown in FIG. 12. The device cuts a mouth patch from the facial area and passes it to step 2502 (FIG. 25). The mouth patch corresponds to the bounding box of the group candidate of the selected group.

Usually the lips present lower intensity compared to the regions above and below the mouth. Such vertical intensity inconsistency makes it possible to estimate the positions of mouth corners by using a 3-rectangle filter.

Figure 26:
FIG. 26 illustrates an erosion template in one embodiment of the invention.

Referring to FIG. 25, in step 2502, the device applies gray level erosions to the mouth patch. Gray level erosion makes the intensity inconsistency between the lips and the regions above and below the mouth more prominent. The device erodes the mouth patch only in the y direction in order to keep the positions of the mouth corners unchanged. FIG. 26 illustrates the erosion template in one embodiment of the invention. The erosion template is a 1 by 3 rectangular template of 1's that provides erosion only in the y direction.

In step 2504, the device applies a 3-rectangle filter to the mouth patch. In the resulting grayscale map, the intensity inconsistency is magnified and information in the smooth area is suppressed to make the mouth corners easier to detect. In one embodiment, 3-rectangle filter 800 described above in equation 3.0 is used to generate an intensity response map.

In step 2506, the device binarizes the intensity response map to generate a binary mask. In one embodiment, the device binarizes the intensity response map in the same way the device binarizes the eye patch in step 1706 illustrated in FIG. 19. In one embodiment, percentage p is set to 90% from experience.

In step 2508, the device estimates the mouth corners by applying a conventional contour extraction algorithm to the binary mask. The mouth corners are then selected as the left most and the right most points in the contours of the binary mask.

Chin Point Detection

Figure 27:
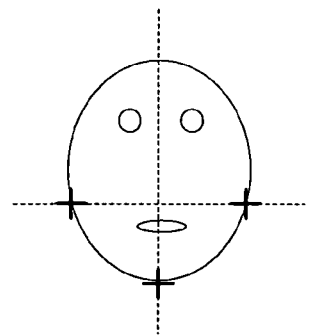
FIG. 27 illustrates a chin point and cheek points on a face in one embodiment of the invention.

For a frontal face image, the chin point is located at the intersection between the face boundary and a vertical line passing through the center of the mouth as shown in FIG. 27. Due to the simplicity of its patterns, the chin point is not easily discriminated from other objects through the use of example-based classifiers. Furthermore, since the positions of the mouth corners and the eyes have been estimated in the previous steps, the position of the chin point may be estimated using geometric constraints. In addition, experience teaches that a strong color inconsistency exists at the boundary of the face. This strong color inconsistency may be used to detect the chin point. Accordingly, two methods are provided to locate the chin point. The first method is based on gradient analysis that measures the color inconsistency at the face boundary in the derivative space where the gradient analysis is geometrically constrained within a certain angle. The second method is based on color classification using a color model called Multi-Gaussian Mixture Model.

Chin Point Detection Using Angled Constrained Gradients

A gradient is commonly used to measure intensity difference. It computes image derivates in the x and y directions. Hence, the color inconsistency at the face boundary can be detected by gradient analysis. However, there are other features in the image that also present color inconsistencies. For example, wrinkles on the face, areas between facial features, and even complex background may also present color inconsistencies. Thus, an angle constrained gradient method is proposed to detect the chin point. Only gradients that meet an angle constraint are used in chin point detection.

Figure 28:
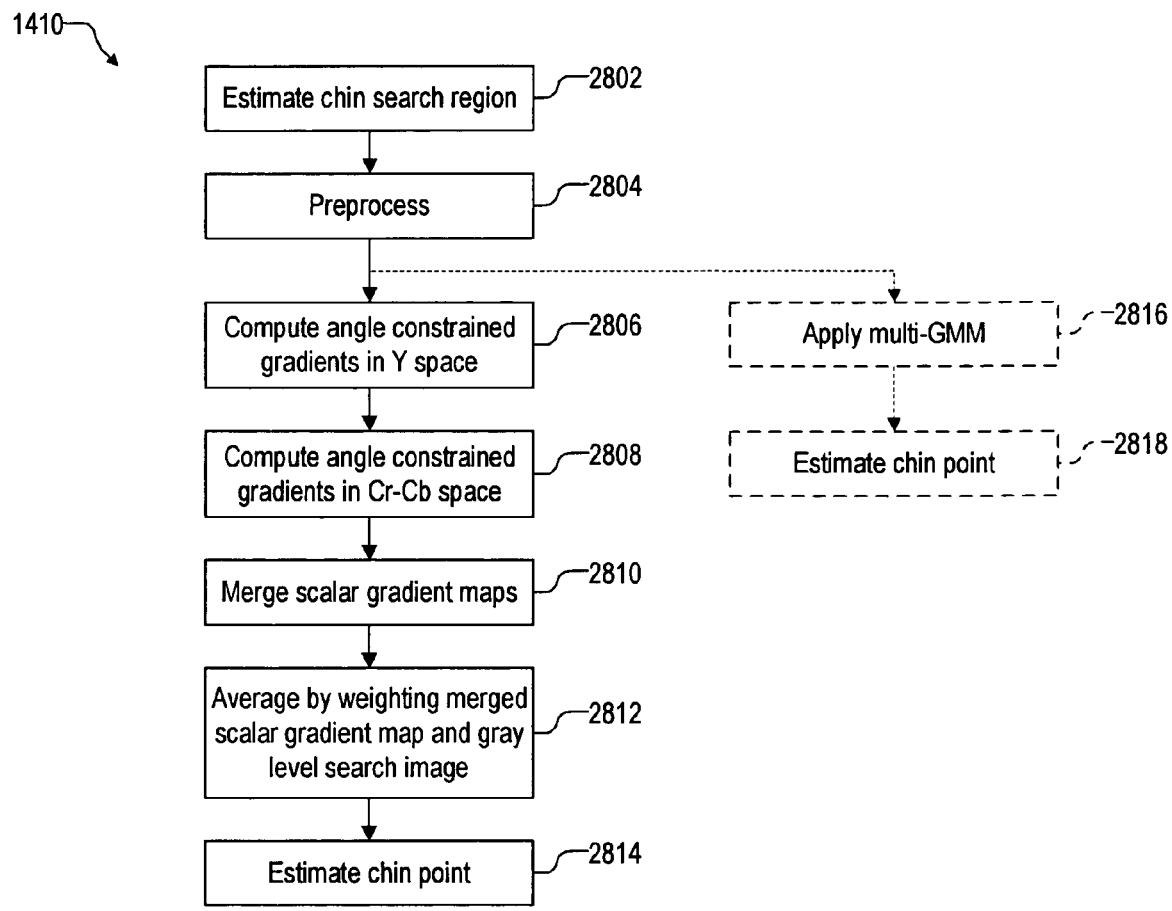
FIG. 28 is a flowchart of a method for detecting a chin point from a facial area in the method of FIG. 14 in one embodiment of the invention.

FIG. 28 is a flowchart of step 1410 (FIG. 14) for detecting a chin point using angle constrained gradients in one embodiment of the invention.

Figures 29, 30:
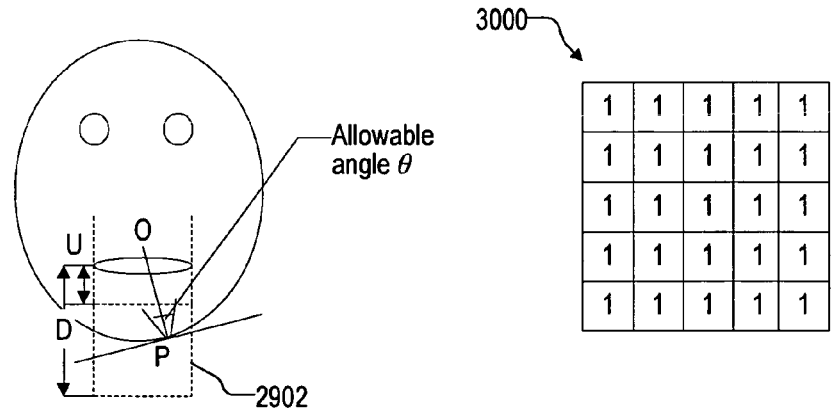
FIG. 29 illustrates the estimation of a chin point search region in one embodiment of the invention.
FIG. 30 illustrates a blurring template in one embodiment of the invention.

In step 2802, the device estimates a chin search region on the facial area. FIG. 29 illustrates the estimation of a chin search region 2902. The left and the right boundaries of chin search region 2902 are determined by the coordinates of the mouth corners. The top and the bottom boundaries of chin search region 2902 are defined as follows:

$$U = Elen * 0.45, \quad (20.1)$$

$$D = Elen * 0.85, \quad (20.2)$$

where "U" is the distance from the mouth corners to the top boundary of chin search region 2902, "D" is the distance from the mouth corners to the bottom boundary of chin search region 2902, and "Elen" is the distance between the two irises.

In step 2804, the device preprocesses the chin search region. As the angle constrained gradient method is prone to being affected by image noise, especially in processing images captured by low quality cameras, the device blurs each pixel of the image using a template 3000 shown in FIG. 30. Template 3000 averages the intensities of the pixels in a 5 by 5 neighborhood to smooth the image for gradient analysis.

The device further changes the chin search region from RGB space to YCrCb space. In the YCrCb space, it is easier to separate skin color from background.

In step 2806, the device computes the angle constrained gradients in the Y space for form a first scalar gradient map. One embodiment of step 2806 is described hereafter in reference to FIG. 31.

Computing Angle Constrained Gradients in Y Space

Figure 31:
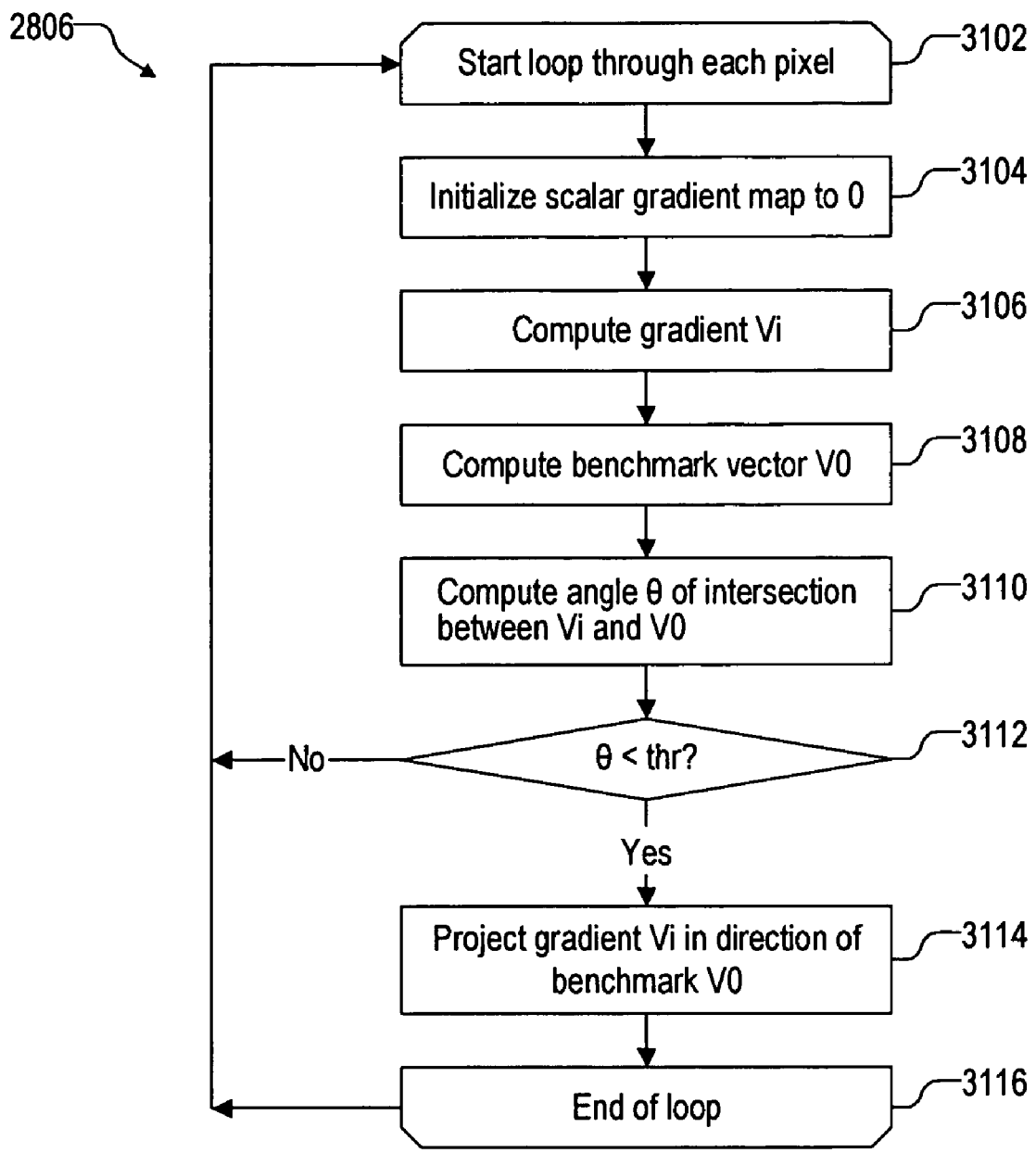
FIG. 31 is a flowchart of a method for computing angle constrained scalar gradients in the Y space in the method of FIG. 28 in one embodiment of the invention.

FIG. 31 is a flowchart of step 2806 (FIG. 28) for computing angled constrained gradients in the Y color space in one embodiment of the invention.

In step 3102, the device starts the loop through each pixel in the chin search region. Step 3102 is followed by step 3104.

In step 3104, the device initializes a scalar gradient map for the angle constrained gradient in the Y space to zero. Step 3104 is followed by step 3106.

In step 3106, the device computes the gradient at the pixel as follows:

$$V_i = [g_x, g_y]^T, \quad (21.1)$$

$$g_x(i) = \frac{I(i_x + 1, i_y) - I(i_x - 1, i_y)}{2}, \quad (21.2)$$

$$g_y(i) = \frac{I(i_x, i_y + 1) - I(i_x, i_y - 1)}{2}, \quad (21.3)$$

where "Vi" is the gradient at a pixel "i", "$g_x(i)$" and "$g_y(i)$" represent the gradients in the x and y directions, respectively, "I" is an intensity of a pixel at the specified coordinates, "$i_x$" and "$i_y$" are x and y coordinates of pixel i, respectively Step 3106 is followed by step 3108.

In step 3108, the device calculates a benchmark vector at the pixel. The benchmark vector is defined as a unit vector $V_0$ in a direction $\overrightarrow{PO}$ (FIG. 29), where P is the current pixel in the loop and O is the origin located at the nose tip detected in step 1406 (FIG. 14). Step 3108 is followed by step 3110.

In step 3110, the device computes an angle "θ" formed by the intersection of gradients $V_i$ and $V_0$ as follows:

$$\theta = \arccos(\langle V_o, V_i \rangle / \|V_i\|). \quad (22.0)$$

Step 3110 is followed by step 3112.

In step 3112, the device determines if angle θ is less than a predefined threshold "thr" that enforces the angle constraint. If so, then step 3112 is followed by step 3114. Otherwise step 3112 is followed by step 3102. In one embodiment, threshold thr ranges from 15 to 30 degrees.

In step 3114, the device projects gradient $V_i$ in the direction of benchmark gradient $V_0$ to determine the value of a scalar gradient at the pixel as follows:

$$g(i) = \langle V_i, V_o \rangle, \qquad (23.0)$$

where "g(i)" is the scalar gradient at a pixel "i". Step 3114 is followed by step 3116.

In step 3116, the device loops back to step 3102 to process another pixel in the chin search region until all the pixels in the chin search region have been processed.

Referring back to FIG. 28, in step 2808, the device computes the angle constrained gradients in the Cr minus Cb (Cr–Cb) space to form a second scalar gradient map. In one embodiment, the angle constrained gradients in the Cr–Cb space is calculated using the same method as step 2806 but in the Cr–Cb space instead of the Y space.

In step 2810, the device merges the first and the second scalar gradient maps generated in steps 2806 and 2808 as follows:

$$g(i) = \max\{g'_Y(i), g'_{Cr-Cb}(i)\}, \qquad (24.0)$$

where "g(i)" is the merged scalar value, "$g'_Y(i)$" and "$g'_{Cr-Cb}(i)$" represent values from the first and the second scalar gradient maps for Y and Cr–Cb spaces normalized to 1, respectively.

In step 2812, the device averages by weighting the merged scalar gradient map and the grayscale image generate in step 2804. As described above, the chin point is located at the face boundary that corresponds to a position with a large value in the scalar gradient map. Through experience, it is known that the face boundary at the chin is usually dark. Thus, the scalar gradient and the intensity values are combined to build a score map as follows:

$$S(x) = (1-\alpha)g(x) + \alpha(-I), \qquad (25.0)$$

where "S(x)" is the score at pixel "x", "$\alpha$" is weight constant, falling in the range of [0,1], "g(x)" is the merged scalar value at pixel x, and "I" represents the intensity of pixel x. In one embodiment, $\alpha$ is set to 0.3.

In step 2814, the chin point is estimated as the position with the largest value on the score map.

Chin Point Detection Using Multi-Gaussian Mixture Model

In another embodiment, step 1410 uses a Multi-Gaussian Mixture Model (Multi-GMM) to detect the chin point in steps 2816 and 2818. The Gaussian Mixture Model (GMM) is a commonly used color model in skin color detection. It models the color distribution by a set of Gaussian models. The GMM with "K" number of Gaussian models is defined as:

$$P(w|x) = \sum_{k=1}^{K} \alpha_k G(x, \mu_k, \sigma_k), \qquad (26.0)$$

where P(w|x) is the given the probability the skin color, $\alpha_k$ is the mixing proportions satisfying $$\sum_{k=1}^{K} \alpha_k = 1,$$

"$\mu_k$" and "$\sigma_k$" are the mean value and covariance of the $k^{th}$ Gaussian model, respectively.

If a single GMM is used to model the color distribution of the human face, accurate results cannot be obtained in many cases. For the GMM, the final cut effects and efficiency are sensitive to three main facets: (1) the number of color clusters, (2) the initialization method of GMM, and (3) the degree of the fit between the generated GMM and the actual color data. First, the algorithm proposed by P. Gao and M. R. Lyu in "A Study on Color Space Selection for Determining Image Segmentation Region Number," in Proceedings of ICAI, vol. 3, pp. 1127-1132, 2000, is used to determine the proper number of color clusters. Second, the Linde-Buzo-Gray (LBG) algorithm is used to initialize the GMM. The LBG algorithm can make more precise initial value at additional cost. The LBG algorithm is iteratively split and re-estimated to yield an initial GMM. Third, the more closely the color distribution model fits the color datum, the more precise the cut results will be. This is a key factor for the most difficult case where background and foreground are very similar. Thus, multiple GMMs are applied to generate a tighter color distribution description.

In step 2816, the Multi-GMM model is used to separate the skin color pixels from the non-skin color pixels. Through color classification, the face boundary is separated from the background.

In step 2818, a chin point is detected from the face boundary. The chin point is selected as the lowest point in the face boundary.

Cheek Points Detection

Figure 32:
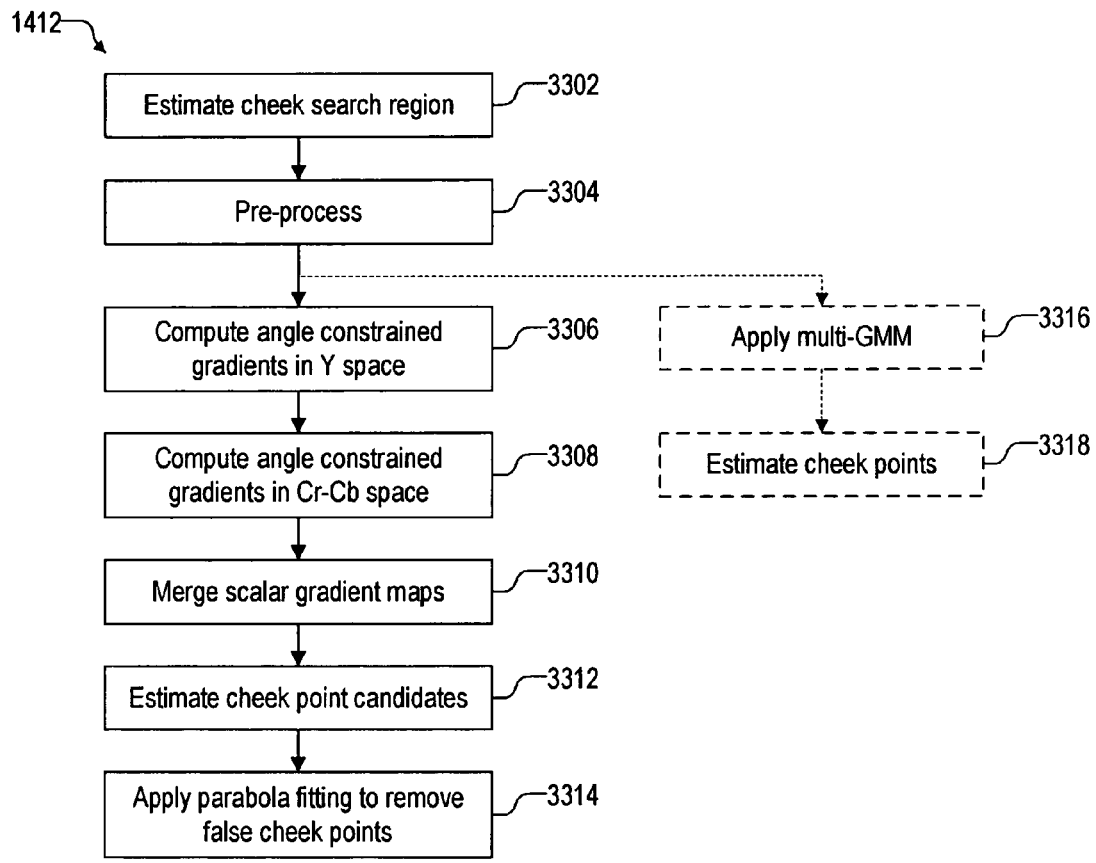
FIG. 32 is a flowchart of a method for detecting cheek points from a facial area in the method of FIG. 14 in one embodiment of the invention.

FIG. 32 is a flowchart of step 1412 (FIG. 14) for detecting a cheek point from the facial area in one embodiment of the invention. Cheek points are defined as the intersection between the face boundary and a horizontal line a little higher than the mouth. As shown in FIG. 27, the upper two crosses represent two cheek points. Step 1412 is similar to step 1410 described above.

Figure 33:
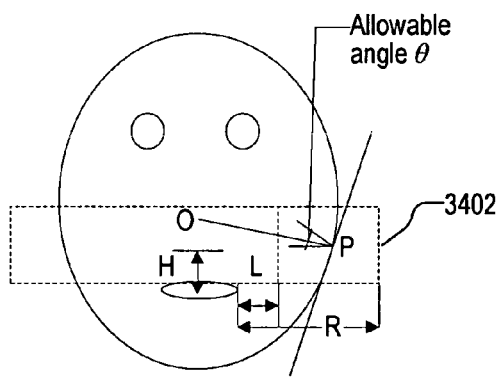
FIG. 33 illustrates the estimation of a cheek point search region in one embodiment of the invention.

In step 3302, the device estimates a left cheek search region 3402 as shown in FIG. 33. The height of left cheek search region 3402 is set to 20 pixels. The width and the location of left cheek searching region 3402 are defined as follows:

$$H = 0.1 * NEdis, \qquad (27.1)$$

$$L = 0.3 * Elen, \qquad (27.2)$$

$$R = 0.85 * Elen, \qquad (27.3)$$

where "H" is the vertical distance between the mouth to the center of left cheek search region 3402, "NEdis" is the vertical distance between the mouth and the midpoint between the two irises, "L" is the horizontal distance from the right mouth corner to the left boundary of left check search region 3402, "Elen" is the distance between the two irises, and "R" is the horizontal distance from the right mouth corner to the right boundary of left check search region 3402. Note that the coordinate of the mouth is the midpoint between the mouth corners determined in step 1408 (FIGS. 23 and 25).

In step 3304, the device preprocesses the cheek search region. The device blurs the cheek search region using the template defined in FIG. 30. The template averages the intensities of the pixels in a 5 by 5 neighborhoods to smooth the image for gradient analysis.

The device further changes the chin search region from RGB space to YCrCb space. In the YCrCb space, it is easier to separate skin color from background.

In step 3306, the device computes the angle constrained gradients in the Y space to generate a first scalar gradient map.

This is the same process as described above for step 2806 (FIGS. 28 and 31) but for two changes.

The first change is that the angle θ between the gradient and the benchmark vectors is now defined as follows:

$$\theta = \arccos(abs(\langle V_i, V_o \rangle)/\|V_i\|). \quad (28.0)$$

The second change is that the first scalar gradient map is now defined as follows:

$$g(i) = abs(\langle V_i, V_o \rangle). \quad (29.0)$$

In step 3308, the device computes the angle constrained gradients in the Cr–Cb space to generate a second scalar gradient map. In one embodiment, the angle constrained gradients in the Cr–Cb space is calculated using the same method in step 3306 but in the Cr–Cb space instead of the Y space.

In step 3310, the device merges the first and the second scalar gradient maps from steps 3306 and 3308 as follows:

$$g(i) = \max\{g'_Y(i), g'_{Cr-Cb}(i)\}, \quad (30.0)$$

where "$g'_Y(i)$" and "$g'_{Cr-Cb}(i)$" represent values from the first and the second scalar gradient maps in Y and Cr–Cb spaces normalized to 1, respectively.

In step 3312, the device combines the merged scalar gradient values and the intensity values to build a score map as described above for step 2812 (FIG. 28). Usually the cheek point is at the position with the biggest gradient value in the scalar gradient map. However, due to the complex background or the facial expression, the gradient value at the cheek point may be large but not the largest values. Thus, several cheek point candidates are selected from the score map. The cheek point candidates have gradient values that are at least 50% of the largest gradient value in the score map.

Figure 34:
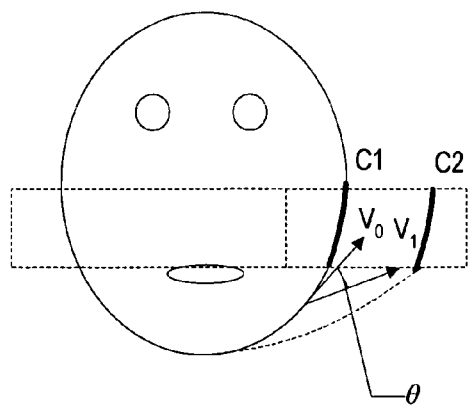
FIG. 34 illustrates the parabola fitting of cheek point candidates to detect a cheek point in one embodiment of the invention.

In step 3314, the device applies parabola fitting to remove false check point candidates. FIG. 34 illustrates the parabola fitting of two candidates C1 and C2 of the right check point where candidate C1 is the real cheek point and candidate C2 is background noise. Parabola fitting assumes that the cheek point and the face contour along the chin point can be treated as a part of a parabola with the origin located at the chin point. The details of the parabola fitting are described hereafter in references to FIG. 35.

Steps 3302 to 3314 may be repeated for a right cheek search region to detect a right cheek point. Alternatively, the location of the left cheek point is mirrored to generate the right cheek point.

Parabola Fitting Cheek Point Candidates

Figure 35:
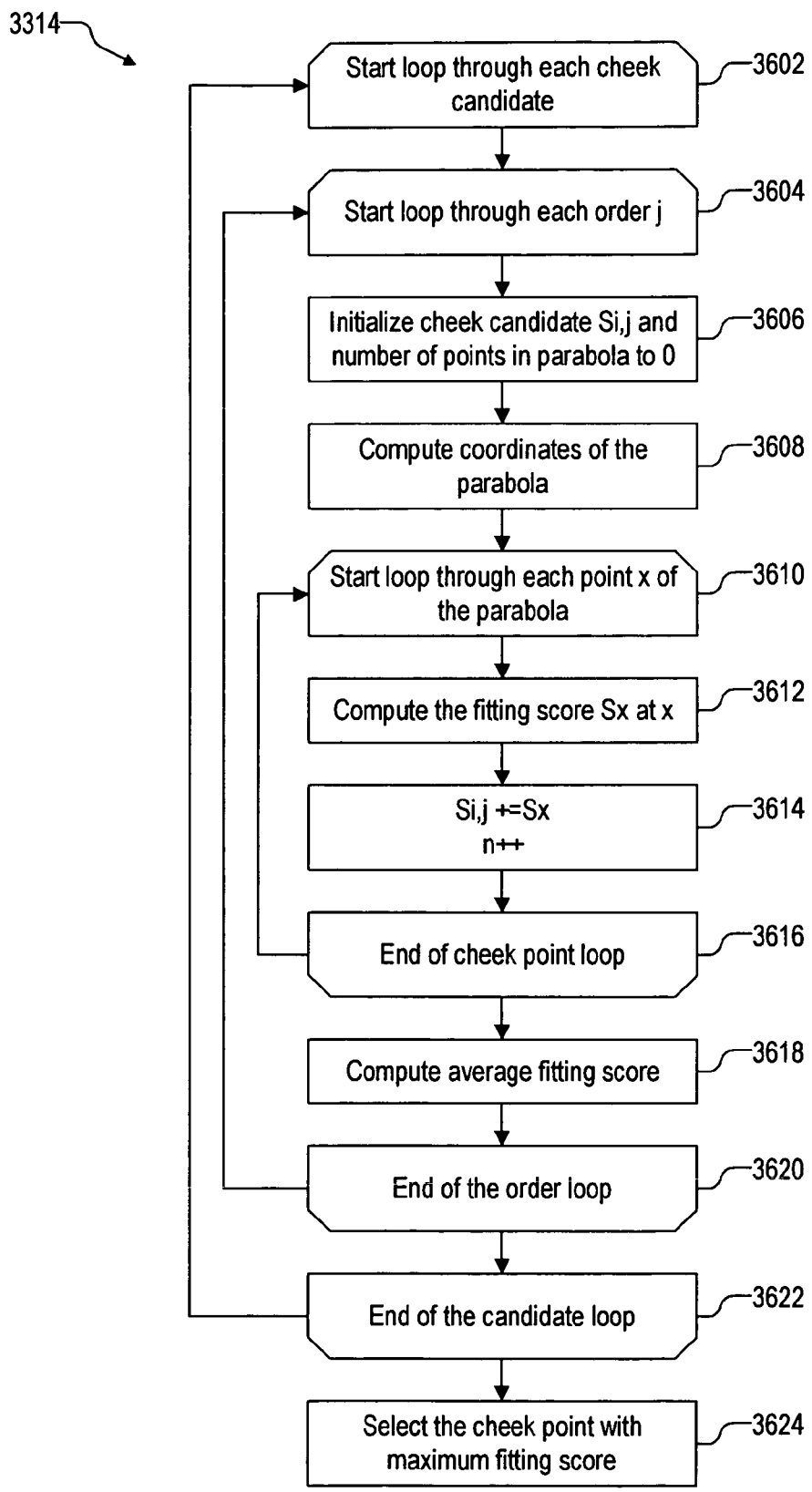
FIG. 35 is a flowchart of a method for parabola fitting the cheek point candidates to detect a cheek point in one embodiment of the invention.

FIG. 35 is a flowchart of step 3314 (FIG. 32) for parabola fitting cheek point candidates in one embodiment of the invention.

In step 3602, the device starts to loop through each cheek point candidate. Step 3602 is followed by step 3604.

In step 3604, the device starts to loop through each order of the parabola. In one embodiment of the invention, two orders of 2 and 3 are used. Step 3604 is followed by step 3606.

In step 3606, the device initializes a fitting score "$S_{i,j}$" for each cheek point candidate "i" and for each order "j" to zero, and the number "n" of points in the parabola to zero. Step 3606 is followed by step 3608.

In step 3608, the device computes the coordinates of the parabola as follows:

$$y = ax^b. \quad (31.0)$$

Once the coordinates of the cheek point candidate and order b are fixed, parameter a is determined. In other words, the chin point is set as the origin of the parabola and the cheek point candidate is set as a point on the parabola. Step 3608 is followed by step 3610.

In step 3610, the device starts to loop through each point x of the parabola. Step 3610 is followed by step 3612.

In step 3612, the device computes fitting score "$S_x$" at point x. The fitting score Sx is defined as the projection of the gradient in the normal direction of the parabola as follows:

$$S_x = abs(\langle V_x, N_x \rangle), \quad (32.0)$$

where "$V_x$" is the gradient at point x, and "$N_x$" is the normal of the parabola at x.

In step 3614, the device increments fitting score $S_{i,j}$ by fitting score $S_x$, and increments the number n by 1. Step 3614 is followed by step 3616.

In step 3616, the device loops back to step 3610 to process another point of the parabola until all the points of the parabola have been scored. When all the points of the parabola have been scored, step 3616 is followed by step 3618.

In step 3618, the device computes the average fitting score of the parabola by dividing the fitting score Si,j by the number n of pixels. Step 3618 is followed by step 3620.

In step 3620, the device loops back to step 3604 to process another order until all the orders have been scored. When all the orders have been scored, step 3620 is followed by step 3622.

In step 3622, the device loops back to step 3602 to process another cheek point candidate until all the cheek point candidates have been scored. When all the cheek point candidates have been scored, step 3620 is followed by step 3624.

In step 3624, the device determines a real cheek point C as follows:

$$C = \underset{i,j}{\mathrm{argmax}}\{S_{i,j}\}. \quad (33.0)$$

Chin Point Detection Using Multi-Gaussian Mixture Model

In another embodiment, step 1412 uses Multi-Gaussian Mixture Module to detect the cheek point as shown in steps 3316 and 3318. Steps 3316 and 3318 are similar to steps 2816 and 2818 (FIG. 28) for chin detection. Based on the result of the color classification, the position of the cheek point is estimated at the face boundary.

Various other adaptations and combinations of features of the embodiments disclosed are within the scope of the invention. Numerous embodiments are encompassed by the following claims.

What is claimed is:

1. A computer-readable storage medium encoded with executable instructions for execution by a processor to locate facial features on a facial area, the instructions comprising:

locating an eye location, comprising:

generating an intensity response map by applying a 3-rectangle filter to pixels in an eye slice from the facial area; and applying K-mean clustering to the intensity response map to determine the eye location;

locating an eye corner location, comprising:

preprocessing pixels in an eye patch from the facial area by applying logarithm transform and grayscale stretching to generate a grayscale eye patch;

generating a binary map by binarizing the grayscale eye patch using a threshold based on a histogram of the grayscale eye patch; and estimating the eye corner location by averaging coordinates weighted by minimal eigenvalues of spatial gradient matrices in an eye corner search region based on the binary map;

locating a mouth corner location, comprising:
generating another intensity response map by applying another 3-rectangle filter to pixels in a mouth patch from the facial area; and
generating another binary map by binarizing the another intensity response map using another threshold based on another histogram of the another intensity response map;

locating a chin location, comprising:
applying angle constrained gradient analysis to reject locations in a chin search region from the facial area that cannot be the chin location; and locating a cheek location, comprising:
applying another angle constrained gradient analysis to reject locations in a cheek search region from the facial area that cannot be the cheek location; and
removing falsely detected cheek location candidates by parabola fitting curves through the chin location and cheek location candidates.

2. The computer-readable storage medium of claim 1, wherein said locating an eye location further comprises:
splitting the eye slice based on two eye locations to form eye patches;
applying an AdaBoost filter to the eye patches to identify eye candidates; and
for each eye patch:
grouping eye candidates into groups based on their locations, each group having a group candidate;
for each group, calculating a sum of minimum differences to a threshold of the AdaBoost filter of the eye candidates in said each group; and
selecting a group candidate of a group with a largest sum of minimum differences as the eye.

3. The computer-readable storage medium of claim 2, after said splitting the eye slice and before said applying an AdaBoost filter, the instructions further comprising:
generating a mirror image of one of the eye patches, wherein the AdaBoost filter is trained with only samples of one of a right eye and a left eye.

4. The computer-readable storage medium of claim 2, wherein in said locating an eye location, said applying a 3-rectangle filter comprises:
for each pixel in the eye slice, calculating a sum of (1) a first difference between corresponding pixel intensities in a middle rectangle and a top rectangle in the facial area, and (2) a second difference between corresponding pixel intensities in the middle rectangle and a bottom rectangle in the facial area, wherein the top rectangle is atop the middle rectangle and the middle rectangle is atop the bottom rectangle.

5. The computer-readable storage medium of claim 4, wherein said locating an eye location further comprises:
creating an integral image of the a color image comprising the facial area, wherein said calculating a sum comprises using the integral image to calculate the sum.

6. The computer-readable storage medium of claim 1, wherein said locating an eye location further comprises:
estimating the eye slice on the facial area, comprising:

$ULx = W*EyeX - W*EyeW/2,$ $ULy = H*EyeY - H*EyeH/2,$ $DRx = W*(1-EyeX) + W*EyeW/2,$ $DRy = H*EyeY + H*EyeH/2,$ where "W" and "H" are respective width and height of the facial area normalized to 1, "ULx" and "ULy" are respective x and y coordinates of a top left corner of the eye slice, "EyeW" is a width of one eye set equal to 0.45, "EyeH" is a height of one eye set equal to 0.3, "EyeX" is an x coordinate of a center of a left eye set equal to 0.315, "EyeY" is a y coordinate of the center of the left eye set equal to 0.344, and "DRx" and "DRy" are respective x and y coordinates of a bottom right corner of the eye slice.

7. The computer-readable storage medium of claim 1, wherein in said locating an eye corner location, said applying logarithm transform comprises:

$Y(x) = \log(I(x)+1),$ where "x" represents a pixel, and "I" and "Y" represent the intensities before and after the transformation, respectively.

8. The computer-readable storage medium of claim 1, wherein in said locating an eye corner location, said applying grayscale stretching comprises:
determining a lower bound "L" intensity value as follows:

$$L = \underset{i}{\operatorname{argmin}}\left\{\sum_i H(i) > N*R\right\},$$

determining an upper bound "H" intensity value as follows:

$$H = \underset{i}{\operatorname{argmin}}\left\{\sum_i H(i) > N*(1-R)\right\}, \text{ and}$$

determining a new intensity value "I'" as follows:

$I'(x) = (Y(x)-L)*255/(H-L),$ where "H(i)" is a histogram value, "N" is a number of pixels in the eye patch, "i" represents an intensity value, "arg min" is a minimum of all values that meet a condition specified between { }, "R" is a grayscale stretching ratio, and "x" represents coordinates of a pixel.

9. The computer-readable storage medium of claim 1, wherein in said locating an eye corner location, said binarizing the grayscale eye patch comprises:
computing the histogram of the grayscale eye patch; and
determining the threshold for said binarization, comprising:

$$thr = \underset{i}{\operatorname{argmin}}\left\{\sum_{j<=i} H(j) >= p*N\right\},$$

where "i" is an intensity value ranging from 0 to 255, "j" is an intensity value ranging from 0 to 255, "H(j)" is a histogram value at the intensity j, "p" is a percentage, and "N" is a number of pixels in the grayscale eye patch.

10. The computer-readable storage medium of claim 1, wherein in said locating an eye corner location, said estimating the eye corner location comprises:
defining the eye corner search region on the grayscale eye patch;
for each pixel in the eye corner search region, calculating a spatial gradient matrix;
for each spatial gradient matrix, calculating a minimum eigenvalue;

determining a maximum of minimum eigenvalues of spatial gradient matrices;

setting an eigenvalue threshold proportional to the maximum of minimum eigenvalues;

for each minimum eigenvalue that is greater than the eigenvalue threshold, incrementing (1) coordinates of the eye corner location by coordinates of a corresponding pixel of the minimum eigenvalue, and (2) a number of pixels having eigenvalues greater than the threshold; and dividing the coordinates of the eye corner location by the number of pixels.

11. The computer-readable storage medium of claim 10, wherein the eye corner search region is centered at one of a left most and a right most position of a white region in the binary map, said defining the eye corner search region comprises:

$w=Elen*0.2$, and $h=Elen*0.3$, where "w" and "h" are respective width and the height of the eye corner search region, and "ELen" is a distance between two eye locations.

12. The computer-readable storage medium of claim 1, wherein said locating a mouth corner location, prior to said generating another intensity response map, further comprising:

estimating a mouth search region;

applying an AdaBoost filter to the mouth search region to identify mouth candidates;

grouping the mouth candidates into groups based on their locations, each group having a group candidate;

for each group, calculating a sum of minimum differences to a threshold of the AdaBoost filter of the mouth candidates in said each group; and selecting a group candidate of a group with a largest sum of minimum differences as the mouth patch.

13. The computer-readable storage medium of claim 12, wherein said estimating a mouth search region comprises:

$L=W*0.15$, $R=W*0.85$, $U=Elen*0.5$, and $D=Elen*1.8$, where "L" is a left margin from the mouth search region to a left edge of the facial area, "W" is a width of the facial area, "R" is a right margin from the mouth search region to a right edge of the facial area, "U" is a distance from a midpoint of two eye locations to the top of the mouth search region, "Elen" is the distance between the two eye locations, and "D" is a distance from the midpoint to the bottom of the mouth search region.

14. The computer-readable storage medium of claim 1, wherein in said locating a mouth corner location, said applying another 3-rectangle filter comprises:

for each pixel in the mouth patch, calculating a sum of (1) a first difference between corresponding pixel intensities in a middle rectangle and a top rectangle in the facial area, and (2) a second difference between corresponding pixel intensities in the middle rectangle and a bottom rectangle in the facial area, wherein the top rectangle is atop the middle rectangle and the middle rectangle is atop the bottom rectangle.

15. The computer-readable storage medium of claim 14, wherein said locating a mouth corner location further comprises:

creating an integral image of a color image comprising the facial area, wherein said calculating a sum comprises using the integral image to calculate the sum.

16. The computer-readable storage medium of claim 1, wherein said locating a mouth corner location further comprises:

applying gray level erosion to the mouth patch prior to said applying another 3-rectangel filter.

17. The computer-readable storage medium of claim 1, wherein in said locating a mouth corner location, said binarizing the another intensity response map comprises:

computing the another histogram of the another intensity response map; and determining the another threshold for said binarization the another intensity response map, comprising:

$$thr = \mathrm{argmin}_i \left\{ \sum_{j<=i} H(j) >= p*N \right\},$$

where "i" is an intensity value ranging from 0 to 255, "j" is an intensity value ranging from 0 to 255, "H(j)" is a histogram value at the intensity j, "p" is a percentage, and "N" is a number of pixels in the the another intensity response map.

18. The computer-readable storage medium of claim 1, wherein in said locating a chin location, said applying angle constrained gradient analysis comprises:

estimating the chin search region;

generating a first scalar map of the chin search region by calculating angled constrained gradients in a first color space;

generating a second scalar map of the chin search region by calculating angled constrained gradients in a second color space;

merging the first and the second scalar maps to form a merged scalar map;

generating a score map by weighting pixel values from the merged scalar map and the chin search region; and selecting a location of a pixel having a largest score from the score map as the chin location.

19. The computer-readable storage medium of claim 18, wherein said estimating the chin search region comprises:

setting left and the right boundaries of the chin search region by a width of two mouth corners; and setting top and the bottom boundaries of the chin search region as follows:

$U=Elen*0.45$, and $D=Elen*0.85$, where "U" is a distance from the two mouth corners to the top boundary of the chin search region, "D" is a distance from the two mouth corners to the bottom boundary of the chin search region, and "Elen" is the distance between two eye locations.

20. The computer-readable storage medium of claim 18, wherein said merging the first and the second scalar maps comprises selecting larger of corresponding values in the first and the second scalar maps to form the merged scalar map.

21. The computer-readable storage medium of claim 18, wherein said generating a first scalar map comprises:

initializing the first scalar map; and for each pixel in the chin search region:
  computing a gradient in Y space;
  computing a benchmark vector from a nose tip to said each pixel;
  determining an angle between the gradient and the benchmark vector;
  determining if the angle is less than an angle threshold; and
  when the angle is less than the angle threshold, projecting the gradient in the direction of the benchmark vector to determine a value of a scalar gradient at said each pixel.

22. The computer-readable storage medium of claim 18, wherein said generating a second scalar map comprises:
  initializing the second scalar map; and
  for each pixel in the chin search region:
    computing a gradient in Cr–Cb space;
    computing a benchmark vector from a nose tip to said each pixel;
    determining an angle between the gradient and the benchmark vector;
    determining if the angle is less than an angle threshold; and
    when the angle is less than the angle threshold, projecting the gradient in the direction of the benchmark vector to determine a value of a scalar gradient at said each pixel.

23. The computer-readable storage medium of claim 18, wherein said locating a chin location farther comprises:
  blurring the chin search region prior to said generating a first scalar map of the chin search region.

24. The computer-readable storage medium of claim 1, wherein in said locating a cheek location, said applying another angle constrained gradient analysis comprises:
  estimating the cheek search region;
  generating a first scalar map of the cheek search region by calculating angled constrained gradients in a first color space;
  generating a second scalar map of the cheek search region by calculating angled constrained gradients in a second color space;
  merging the first and the second scalar maps to form a merged scalar map;
  generating a score map by weighting pixel values from the merged scalar map and the cheek search region; and
  selecting a location of a pixel having a largest score from the score map as the cheek location.

25. The computer-readable storage medium of claim 24, wherein in said locating a cheek location, said estimating the check search region comprises:

$$H = 0.1 * NEdis,$$

$$L = 0.3 * Elen, \text{ and}$$

$$R = 0.85 * Elen,$$

where "H" is a vertical distance between a midpoint of two mouth corners to a center of the cheek search region, "NEdis" is a vertical distance between the midpoint of the two mouth corners and a midpoint between two eye locations, "L" is a horizontal distance from one mouth corner to a left boundary of the check search region, "Elen" is a distance between the two eye locations, and "R" is a horizontal distance from the one mouth corner to a right boundary of the check search region.

26. The computer-readable storage medium of claim 24, wherein said merging the first and the second scalar maps comprises selecting larger of corresponding values in the first and the second scalar maps to form the merged scalar map.

27. The computer-readable storage medium of claim 24, wherein said generating a first scalar map comprises:
  initializing the first scalar map; and
  for each pixel in the cheek search region:
    computing a gradient in Y space;
    computing a benchmark vector from a nose tip to said each pixel;
    determining an angle between the gradient and the benchmark vector;
    determining if the angle is less than an angle threshold; and
    when the angle is less than the angle threshold, projecting the gradient in the direction of the benchmark vector to determine a value of a scalar gradient at said each pixel.

28. The computer-readable storage medium of claim 24, wherein said generating a second scalar map comprises:
  initializing the second scalar map; and
  for each pixel in the cheek search region:
    computing a gradient in Cr–Cb space;
    computing a benchmark vector from a nose tip to said each pixel;
    determining an angle between the gradient and the benchmark vector;
    determining if the angle is less than an angle threshold; and
    when the angle is less than the angle threshold, projecting the gradient in the direction of the benchmark vector to determine a value of a scalar gradient at said each pixel.

29. The computer-readable storage medium of claim 1, wherein in said locating a cheek location, said removing falsely detected cheek location candidates comprises:
  (a) for a cheek location candidate, fitting a parabola of an order using the chin location and the cheek location candidate as points in the parabola;
  (b) for each point in the parabola, computing a fitting score comprising an absolute value of projection of a gradient vector of the point along a normal vector of the parabola at said each point;
  (c) summing fitting scores for points in the parabola;
  (d) calculating an averaged fitting score by averaging the fitting scores by a number of the points in the parabola;
  (e) repeating steps (a), (b), (c), (d) for at least another order;
  (f) repeating steps (a), (b), (c), (d), and (e) for at least another cheek location candidate; and
  (g) selecting one of the cheek location candidates with a maximum averaged fining score as the cheek location.

* * * * *

UNITED STATES PATENT AND TRADEMARK OFFICE
CERTIFICATE OF CORRECTION

PATENT NO. : 7,643,659 B2  Page 1 of 1
APPLICATION NO. : 11/323654
DATED : January 5, 2010
INVENTOR(S) : Jiangen Cao et al.

It is certified that error appears in the above-identified patent and that said Letters Patent is hereby corrected as shown below:

Column 23,
Line 57, Claim 5, where "of the a color" should read --of a color--.

Column 24,
Line 9, Claim 6, where ""DRx" and "Dry"" should read --"DRx" and "DRy"--.

Signed and Sealed this
First Day of February, 2011

David J. Kappos
*Director of the United States Patent and Trademark Office*